(12) United States Patent
Wang et al.

(10) Patent No.: US 8,768,049 B2
(45) Date of Patent: Jul. 1, 2014

(54) SMALL VEIN IMAGE RECOGNITION AND AUTHORIZATION USING CONSTRAINED GEOMETRICAL MATCHING AND WEIGHTED VOTING UNDER GENERIC TREE MODEL

(71) Applicant: Seiko Epson Corporation, Tokyo (JP)

(72) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 13/665,480

(22) Filed: Oct. 31, 2012

(65) Prior Publication Data

US 2014/0016830 A1 Jan. 16, 2014

Related U.S. Application Data

(60) Provisional application No. 61/671,279, filed on Jul. 13, 2012.

(51) Int. Cl.
*G06K 9/62* (2006.01)
*G06K 9/00* (2006.01)
*G05B 13/02* (2006.01)
*G06F 17/30* (2006.01)

(52) U.S. Cl.
USPC ............. 382/159; 382/115; 382/224; 700/47; 707/722; 707/736

(58) Field of Classification Search
None
See application file for complete search history.

(56) References Cited

U.S. PATENT DOCUMENTS

| 6,041,133 | A | 3/2000 | Califano et al. | |
|---|---|---|---|---|
| 6,711,293 | B1 | 3/2004 | Lowe | |
| 7,680,748 | B2 * | 3/2010 | Heisele et al. | 706/13 |
| 7,917,490 | B2 * | 3/2011 | Norris et al. | 707/707 |
| 7,949,186 | B2 * | 5/2011 | Grauman et al. | 382/170 |
| 8,005,858 | B1 * | 8/2011 | Lynch et al. | 707/771 |
| 8,311,344 | B2 * | 11/2012 | Dunlop et al. | 382/224 |
| 8,630,513 | B2 * | 1/2014 | Gokturk et al. | 382/305 |
| 2007/0217665 | A1 | 9/2007 | Kiraly et al. | |
| 2007/0217676 | A1 * | 9/2007 | Grauman et al. | 382/170 |
| 2009/0175505 | A1 | 7/2009 | Muquit et al. | |
| 2010/0030778 | A1 | 2/2010 | Liu et al. | |
| 2010/0198078 | A1 | 8/2010 | Abe | |
| 2011/0145247 | A1 * | 6/2011 | Norris et al. | 707/737 |
| 2011/0169934 | A1 | 7/2011 | Pulluru et al. | |
| 2012/0164114 | A1 * | 6/2012 | Abbot et al. | 424/93.7 |
| 2012/0269425 | A1 * | 10/2012 | Marchesotti et al. | 382/159 |
| 2012/0284572 | A1 * | 11/2012 | Shirakawa | 714/54 |
| 2012/0316421 | A1 * | 12/2012 | Kumar et al. | 600/407 |
| 2012/0323906 | A1 * | 12/2012 | Fan et al. | 707/723 |
| 2013/0315477 | A1 * | 11/2013 | Murray et al. | 382/159 |

OTHER PUBLICATIONS

"Combining Discriminative and Generative Methods for 3D Deformable Surface and Articulated Pose Reconstruction", Mathieu Salzmann, EECS & ICSI, UC Berkeley, Raquel Urtasun, TTI, Chicago, Computer Vision and Pattern Recognition (CVPR), 2010 IEEE Conference on Jun. 13-18, 2010, (pp. 647-654).

(Continued)

*Primary Examiner* — Randolph I Chu

(57) ABSTRACT

An automated registration and authentication system combines a generative and discriminative approach to improve the matching of a query object to a database of registered objects. The discriminative approach uses a voting mechanism to identify a most likely match, and the generative approach uses ASIFT transforms to determine a best geometric match. The two results are combined using a technique base on Bayesian inference theory.

19 Claims, 26 Drawing Sheets

(56) References Cited

OTHER PUBLICATIONS

"Fast Keypoint Recognition Using Random Ferns", Mustafa Ozuysal, Michael Calonder, Vincent Lepetit and Pascal Fua, Senior Member, IEEE Transactions on Pattern Analysis and Machine Intelligence, vol. 32, IEEE Computer Society, Jan. 15, 2009, (pp. 1-14).

"Multi-Conditional Learning: Generative/Discriminative Training for Clustering and Classification", Andrew McCallum, Chris Pal, Greg Druck and Xuerui Wang, Department of Computer Science, University of Massachusetts, American Association for Artificial Intelligence, 2006.

"Improving Descriptors for Fast Tree Matching by Optimal Linear Projection", Krystian Mikolajczyk, University of Surrey, UK, Jiri Matas, Czech Technical University, Czech Republic, Computer Vision, 2007, ICCV 2007, IEEE 11th International Conference, Oct. 14-21, 2007, (pp. 1-8).

"Local SIFT Analysis for Hand Vein Pattern Verification", Yunxin Wang, Dayong Wang, Tiegen Liu and Xiuyan Li, College of Applied Sciences, Beijing University, Key Laboratory of Opto-electronics Information and Technical Science of MOE, College of Precision Instrument and Opto-electronics Engineering, China, Proc. of SPIE vol. 7512, 2009 International Conference on Optical Instruments and Technology, 2009, (pp. 751204-1 to 751204-8).

"Palm Vein Verification System based on SIFT matching", Pierre-Olivier Ladoux, Christophe Rosenberger, Bernadette Dorizzi, Institue TELECOM, Laboratoire Greyc, France, hal-00472805, Advances in Biometrics: Third International Conference, ICB 2009, Alghero, Italy, Jun. 2-5, 2009; 1290-1298.

\* cited by examiner

Registered Person's votes must surpass a threshold to be considered a candidate match.

Measurements:

Vote count = $S_n$
Percent difference between top 3 scores $$\Delta S = \frac{S_{1st} - S_{2nd}}{\sum_{n=1A}^{5A} S_n}$$

Confidence in max votes is low because difference between top results is small.

Table 1. Comparison results

| ref. | dataset | result |
|---|---|---|
| [4] | 339×2 images | EER 0.145% |
| [8] | 125×9 images | EER 0.25% |
| [1] | 7×4 images | GAR 95% |
| [12] | 50×10 images | EER 0.761% |
| [10] | 162×10 images | GAR 99% |
| Ours | 232×10 images | EER 0.05% |

*ERR: Equal Error Rate; GAR: Gate Acceptance Rate; Dis.: Our discriminative approach; Dis.+Gen.: Our discriminative and*

FIG. 25

SMALL VEIN IMAGE RECOGNITION AND AUTHORIZATION USING CONSTRAINED GEOMETRICAL MATCHING AND WEIGHTED VOTING UNDER GENERIC TREE MODEL

CONTINUING APPLICATION DATA

This application claims the benefit of priority on U.S. Provisional Application No. 61/671,279, filed Jul. 13, 2012, under 35 U.S.C. §119(e).

BACKGROUND

1. Field of Invention

The present invention generally relates to object recognition in computer vision. More specifically, it relates to a biometric identification system using finger vein patterns as the means for recognition and authentication.

2. Description of Related Art

Biometrics refers to the use of intrinsic human traits for personal identification purposes. That is, a person may be identified by one or a combination of multiple different personal trait characteristics of that person. Examples of such personal traits are a fingerprint, a hand print (length and thickness of the fingers, size of the hand itself), a retina scan (pattern of blood vessels in the eye), an iris scan, a facial photograph, a blood vessel pattern (vein pattern), a voice print, a dynamic signature (the shape and time pattern for writing a signature), or a keystroke pattern (key entry timing).

Typically, a person wanting to be identified as being pre-registered within a registry of persons will submit a sample of a particular biometric, and the submitted biometric is then compared to a library of registered biometric samples in an effort to identify a match. Some biometric samples may originate in the form of an image, such as a fingerprint or iris scan. Computer vision techniques, however, are generally not directly applicable to the field biometrics.

For example, one computer vision technique is the Active Appearance Model (AAM). It typically draws generalities about the look of a specific class (or type) of object from a predefined viewpoint given an extensive library of sample images of that class of object from that predefined viewpoint. That is, an AAM machine examines a large library of training images, identifies commonalties among the sample training images, and then searches for those commonalties (within defined statistical variations) in a test image to determine if a general example of the sought class of object can be found in the test image.

An AAM machine uses the large library of training images of a given object type to define a statistical model of the generally acceptable shape and appearance of the given object, and to further define acceptable variations in the shape and appearance of the object. The prior knowledge gleaned from the training library thus establishes constrains for the AAM machine to search for an instance of the sought object in a test image. AAM machines have found extensive application in face recognition since the human face can generally be described in terms of general predicable characteristics, such as having two neighboring eyes, one nose below a point between the two neighboring eyes, one mouth below the nose, etc. AAM machines are an example of constraining an object search based on previously established expectations.

AAM machines, however, require large libraries and extensive preparation of the training images and the test image. That is, human involvement is required to identify the distinguishing features of an object in the training image, and to mark these features manually. The test image may also require that these distinguishing features be marked prior to being submitted to the AAM machine for identification. In the case of human face recognition, the marking of features in the test image can typically be automated since the general structure of a human face is known. For example, a face detecting algorithm may be used to identify the location of a face within a test image, and a canonical face (i.e. a statistically normalized face based on the library of training images) with its distinguish features already marked may be fitted to onto the located face within the test image.

Unfortunately, most biometrics cannot be condensed to a list of definable, and predictable, distinguishing features shared by a library of training images. For example, a finger vein patterns man not necessary follow consistent, definable predetermined patterns across training images from multiple different people and from different parts of a finger and from different view points of the finger. That is, the arrangement, relative thickness, and number of veins visible in an image will likely not follow predictable and definable constraints. Additionally, it is generally not clear to a human observer what characteristic features may be consistent across all training images of finger veins.

Thus, rather than establishing a general model based on expected characteristics of a test sample, biometrics more typical utilize pattern identification techniques that define a pattern in a given diagnostic image and then compare the defined pattern with a library of pre-registered patterns.

For example, one technique for identifying blood vessel patterns is by means of path-based tree matching, such as described in U.S. Pat. No. 7,646,903. Tree matching algorithms require tree structures as input. Each tree structure describes the tree as a series of branches interconnected through branch points. Several known algorithms can be used to obtain the tree structure including tracking, segmentation, and skeletonization. Once the tree structure is obtained, a matching algorithm operates directly on the structure and any data contained therein.

An integral part of pattern identification techniques is feature detection. In the field of computer vision, techniques are known for identifying feature points, or individual pixels, in an image that may be used to describe an imaged scene. As an example, if one has a library of identifying feature points obtained from a library of training images, then one may search an input digital (test) image for those identifying features in an effort to determine if an example of the specific object is present in the input digital image. In the field of computer vision, this idea has been extended to matching common features of a common scene in multiple digital images of the common scene taken from different view angles to index, i.e. match or correlate, feature points from one image to the other. This permits the combined processing of the multiple digital images.

For example in FIG. 1, images 2, 4, 6 and 8 each provide partial, and overlapping, views of a building in a real-world scene, but none provide a full view of the entire building. However, by applying edge detection and indexing (i.e. identifying matching pairs of) feature points in the four partial images 2, 4, 6 and 8 that correlate to the same real feature point in the real-world scene, it is possible to stitch together the four partial images (i.e. applying an image stitching tool) to create one composite image 10 of the entire building. The four partial images 2-8 of FIG. 1 are taken from the same view angle, but this approach may be extended to the field of correspondence matching, where images of a common scene are taken from different view angles.

In the field of computer vision, correspondence matching (or the correspondence problem) refers to the matching of objects (or object features or feature points) common to two, or more, images. Correspondence matching tries to figure out which parts of a first image correspond to (i.e. are matched to) which parts of a second image, assuming that the second image was taken after the camera had moved, time had elapsed, and/or the pictured objects had moved. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common features points in the overlapped portions of the first and second images.

Correspondence matching is an essential problem in computer vision, especially in stereo vision, view synthesis, and 3D reconstruction. Assuming that a number of image features, or objects, in two images taken from two view angles have been matched, epipolar geometry may be used to identify the positional relationship between the matched image features to achieve stereo view, synthesis or 3D reconstruction.

Epipolar geometry is basically the geometry of stereo vision. For example in FIG. 2, two cameras 11 and 13 create 2D images 15 and 17, respectively, of a common 3D scene 12 consisting of a larger sphere 19 and a smaller sphere 21. 2D images 15 and 17 are taken from two distinct view angles 23 and 24. Epipolar geometry describes the geometric relations between points in 3D scene 12 (for example spheres 19 and 21) and their relative projections in 2D images 15 and 17. These geometric relationships lead to constraints between the image points, which are the basis for epipolar constraints, or stereo constraints.

FIG. 2 illustrates a horizontal parallax where, from the view point of camera 11, smaller sphere 21 appears to be in front of larger sphere 19 (as shown in 2D image 15), but from the view point of camera 13, smaller sphere 21 appears to be some distance to the side of larger sphere 19 (as shown in 2D image 17). Nonetheless, since both 2D images 15 and 17 are of a common 3D scene 12, both are truthful representations of the relative positions of larger sphere 19 and smaller sphere 21. The geometric positional relationships between camera 11, camera 13, smaller sphere 21 and larger sphere 19 thus establish geometric constraints on 2D images 15 and 17 that permit one to reconstruct the 3D scene 12 given only the 2D images 15 and 17, as long as the epipolar, or stereo, constraints are known.

Feature based correspondence matching algorithms have found wide application in computer vision. Examples of feature based correspondence matching algorithms are the scale-invariant feature transform, SIFT, and the Affine SIFT (or ASIFT). It is noted, however, that feature based correspondence matching algorithms such as SIFT and Affine SIFT purposely exclude edge points from their analysis, and thus are not well suited for edge detection.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points have been identified, the feature points can be used to determine if an instance of the object is found in a newly received test image.

Principally, feature points (i.e. points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of the image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

An example of a SIFT determination of feature points is illustrated in FIG. 3. Possible feature points are first identified, as indicated by dark dots in image 16. Possible feature points that have a low contrast are then discarded, as illustrate in image 18. Finally, possible features points located on edges are removed, which leaves the final set of feature points shown in image 20.

Thus, SIFT permits one to match feature points of an identified object from one image to another. This is illustrated in FIG. 4, where three images of the same object, i.e. a happy face, are shown. For illustration purposes, only four feature points, corresponding to points near the eyes and the corners of the mouth, are shown. As indicated in FIG. 4, SIFT can match feature points from a first face 25 to a second face 26 irrespective of a change in scale. SIFT can also match feature points from first face 25 to a third face 27 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, herein incorporated in its entirety by reference.

With reference to FIG. 5, the object in an Affine SIFT would be better able to match feature points from first face 25, to representations of the same object that have undergone affine transformations, as illustrated by happy faces 28, 29, and 30.

An example of an application of an Affine SIFT transform is illustrated in FIG. 6, where multiple feature points are matched from a first image 31 of the stature of liberty from a first view angle, to a second image 32 of the statue of liberty from a different view angle and at a different scale.

It is an object of the present invention to utilize techniques from computer vision to define constrains useful in biometrics to better identify and authenticate a potential registrant.

It is another object of the present invention to combine biometric identification techniques with object recognition techniques to improve biometric matching results.

SUMMARY OF INVENTION

The above objects are met in a method of searching for a query object within an object class, said method comprising: (a) accessing a collection of unique training samples of multiple training objects within said object class; (b) defining a separate training set of training item descriptors from each of said training samples; (c) creating a composite collection of training item descriptors from the separate training sets of sample item descriptors; (d) creating a hierarchical tree from said composite collection of training item descriptors according to relations in the training item descriptors, said hierarchical tree having a plurality of leaf nodes; (e) accessing registration sets of registration item descriptors defined from respective registration samples obtained from registration objects of said object class, distributing said registration sets of registration item descriptors into said hierarchical tree according to said relations defined in the creation of said hierarchical tree, indexing the registration item descriptors clustered within each leaf node to their corresponding registration samples, said indexing including defining reverse index (RI) information at each leaf node specifying for each registration item descriptor within the leaf node, an ID label identifying its corresponding registration sample from which it was defined and geometric information obtained as part of its definition; (f) accessing a query sample from said query object, defining a query set of query item descriptors from said query sample, distributing said query set of query item descriptors into said hierarchical tree according to said relations defined in the creation of said hierarchical tree, each query item descriptor that reaches a leaf node defining a separate potential descriptor-match pair with each individual registration item descriptor that is within the same reached leaf node; (g) submitting the RI information of each leaf node reached by a query item descriptor to a first generative-and-descriminative identification process, wherein: (i) said generative-and-descriminative identification process applies a descriminative matching model to the potential descriptor-match pairs using the ID label information provided by the RI information, the descriminative matching model identifying a first discriminatively-matched registration object with a first descirmiantive confidence; (ii) said generative-and-descriminative identification process applies a generative matching model to the potential descriptor-match pairs using the geometric information within the RI information, said generative matching model identifying a transform that best matches the query item descriptors to a their paired registration item descriptors, and identifying as a first generative-matched registration object with a first generative confidence the registration object best represented by the registration item descriptors matched to the query item descriptors by the identified transform; and (iii) combining the first descirmiantive confidence and the first generative confidence to determine a registration object that matches the query object.

Preferably in (i), the applying of said descriminative matching model to the potential descriptor-match pairs omits use of any geometric information within the RI information.

Further preferably in (ii), the identified transform is a SIFT transform. Also in (ii), the identified transform may be an Affine SIFT transform.

In this approach, in (g) the geometric information obtained as part of its definition include the relative position and orientation of the registration item descriptor within its respective registration sample.

Additionally in (ii), the generative matching model is defined as:

$$P_o(l|X) = \frac{P(X|l)P_r(l)}{\sum_m P(X|m)P_r(m)}$$

where X defines the set of query item descriptors extracted from query sample, $P_r(l)$ is the prior of ID label l, and $P_r(X|l)$ is based on the alignment error.

Additionally the alignment error is a Gaussian defined as:

$$P_o(X|l) = \exp\left(\frac{-\|f(P) - Q_l\|_F^2}{\sigma}\right)$$

where P is the locations of query item descriptors X, and $Q_l$ is the set of corresponding paired registration item descriptors for object l.

Additionally in this approach, in (i), the descriminative matching model uses a voting scheme based on the number of ID labels represented at each leaf node reached by a query item descriptor.

Preferably in (e), the RI information of each leaf node includes a registration path vector of each registration item descriptor through the hierarchical tree on its way to reaching a leaf node; in (f), a query path vector is defined for each query item descriptor that reaches a leaf node, the query path vector being a path vector of each query item descriptor through the hierarchical tree on its way to reaching a leaf node; and in (i), descriminative matching model compares the query path vectors and registration path vectors of the potential descriptor-match pairs in its identifying of the first descriminatively-matched registration object with a first descirmiantive confidence.

Preferably, wherein the number of leaf nodes is N, and X defines the set of query item descriptors extracted from query sample, and the descriminative matching model uses a voting process for registered object l that factorizes a posterior $P_O(l|X)$ into a per-leaf node estimation defined as:

$$P_o(l|X) = \sum_i^N P(l|n_i, X)P(n_i|X)$$

where $n_i$ represent the $i^{th}$ leaf node. $P_O(l|X)$ denotes the probability to observe node $n_i$ given X, and $$P_o(n_i|X) = \begin{cases} 1 & X \text{ has descriptor that reaches } n_i \\ 0 & \text{otherwise,} \end{cases}$$

$P(l|n_i,X)$ is the vote obtained from leaf node $n_i$.

The method of claim 10, wherein the descriminative matching model uses a Term Frequency—Inverse Document Frequency (TF-IDF) technique where each tree node is given an ID-independent weight $w_j$ defined as $$w_j = \ln \frac{I}{I_j}$$

where I is the number of training samples, and $I_j$ is the number of training samples with at least one training item descriptor that passes through node j.

Additionally in this approach, wherein each registration sample with ID label l defines a "path vector" $d_{li}$ at leaf node $n_i$, the dimension of each path vector $d_{li}$ equals to the depth of leaf node $n_i$ in the hierarchical tree, each dimension $d_j$ of path vector $d_{li}$ is equal to $w_j N_j$ the path vector is stored in the RI information of leaf each leaf node $n_i$, the query sample defines a path vector v, and the descriminative matching model defines said first descirmiantive confidence as:

$$P(l|n_i, X) = \begin{cases} \left\| \frac{v}{\|v\|} - \frac{d_{li}}{\|d_{li}\|} \right\| & l \text{ is in the } RI \text{ of } n_i \\ 0 & \text{otherwise.} \end{cases}$$

Preferably in (iii), the combined first descirmiantive confidence and the first generative confidence to determine a registration object that matches the query object is defined as $$P_o(l|X) = \sum_{i}^{N} P(l|n_i, X) \frac{P(X|l, n_i)}{P(X|l)}$$

where N is the number of leaf nodes, X defines the set of query item descriptors extracted from query sample, l is the registered object ID label, where $n_i$ represent the $i^{th}$ leaf node. $P_O(l|X)$ denotes the probability to observe node $n_i$ given X, $P(X|l,n_i)$ is the generative probability to observe X using the registration item descriptors of registration object l registered at leaf node $n_i$, and second term in represents the portion of an alignment error between the query item descriptors and registration item descriptors at leaf node $n_i$.

Further preferably, the query items descriptors that that are not matched to the first descriminatively-matched registration object or to the first generative-matched registration object are re-submitted to a second generative-and-descriminative identification process to identify a second descriminatively-matched registration object and second generative-matched registration object, and the results of the first and second generative-and-descriminative identification processes are compared to determined if a registration object may be matched to the query object.

In this approach, the query object is authenticated if the first and second generative-and-descriminative identification processes agree on the matched registration object.

Further preferably, the query items descriptors that that are not matched to the second descriminatively-matched registration object or to the second generative-matched registration object are re-submitted to a third generative-and-descriminative identification process to identify a third descriminatively-matched registration object and a third generative-matched registration object, and the results of the first, second, and third generative-and-descriminative identification processes are compared to determined if a registered object is matched to the query object.

Additionally in (iii), the first descirmiantive confidence and the first generative confidence are combined using a technique based on Bayesian inference theory.

Preferably, the object class is a finger vein class.

The above object is also met in a non-transient computer readable medium having computer-executable instruction for implementing the presently preferred method, as described herein.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 25 shows tabulated results comparing the present invention to the current state of the art.

DESCRIPTION OF THE PREFERRED EMBODIMENTS

People have many distinctive and personal characteristics that distinguish one person from another. Some examples of these distinguishing characteristics are fingerprints, facial features, vein (or blood vessel) patterns in various parts of the body, voice point, etc. The use of one (or a combination of) such distinguishing characteristics, or traits, to identify (or to verify the identity of) someone is termed Biometrics.

Finger vein recognition is a new biometric identification technology based on the fact that different fingers have different vein patterns. Using vein image for recognition and authentication is non-intrusive and robust against finger surface condition. An attractive attribute of vein recognition is its strong immunity to forgery since the underlying vein pattern is inside the human body and visible only under infrared light, and thus is invisible to the naked eye.

For ease of illustration, the present invention is herein described as applied to vein image recognition, and in particular to finger vein image recognition. It is to be understood, however, that the present invention is equally applicable to other pattern recognition applications and other biometric identification applications, such as for example, fingerprints, hand prints, a retina scans, iris scans, a facial photographs, blood vessel patterns, voice prints, dynamic signatures, keystroke patterns, etc.

Figure 7:
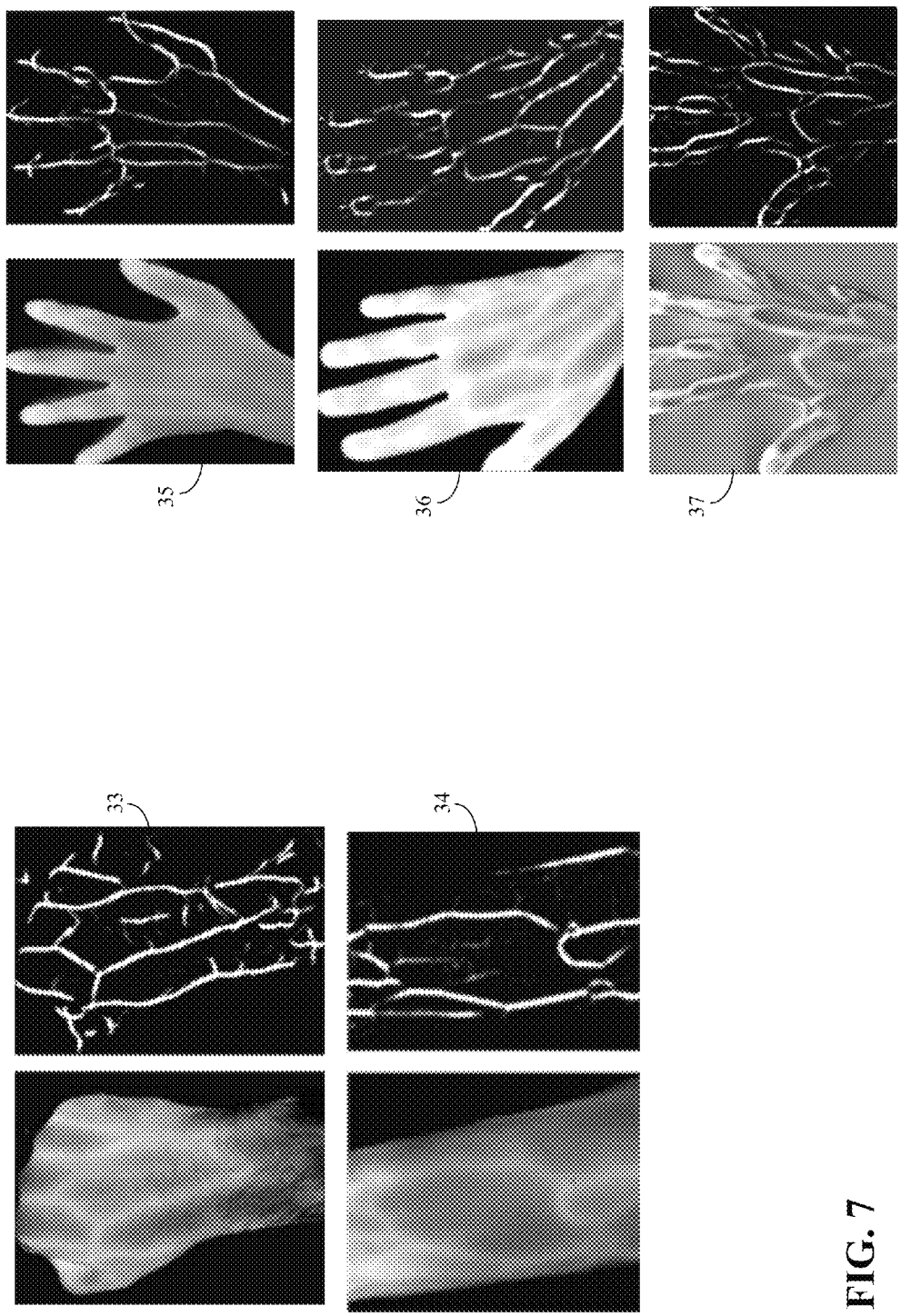
FIG. 7 illustrates examples of vein patterns.

For example, the present method may be applied to various types of vein distribution maps, as illustrated in FIG. 7. Vein maps of the back of a first 33 and an arm 34 are shown. Also shown are three examples 35, 36, and 37 of vein maps of the back of opened hands. As is self-evident, there are general similarities between the three opened hand vein maps 35-37, but each is still distinguishable from all others. Thus, general categories of distinguishing features for a given type of biometric sample (or map) may be defined, but the combination of individual, distinguishing features obtained from a person's biometric sample (as sorted into the defined categories) may still be used to uniquely identify an individual.

Figure 8:
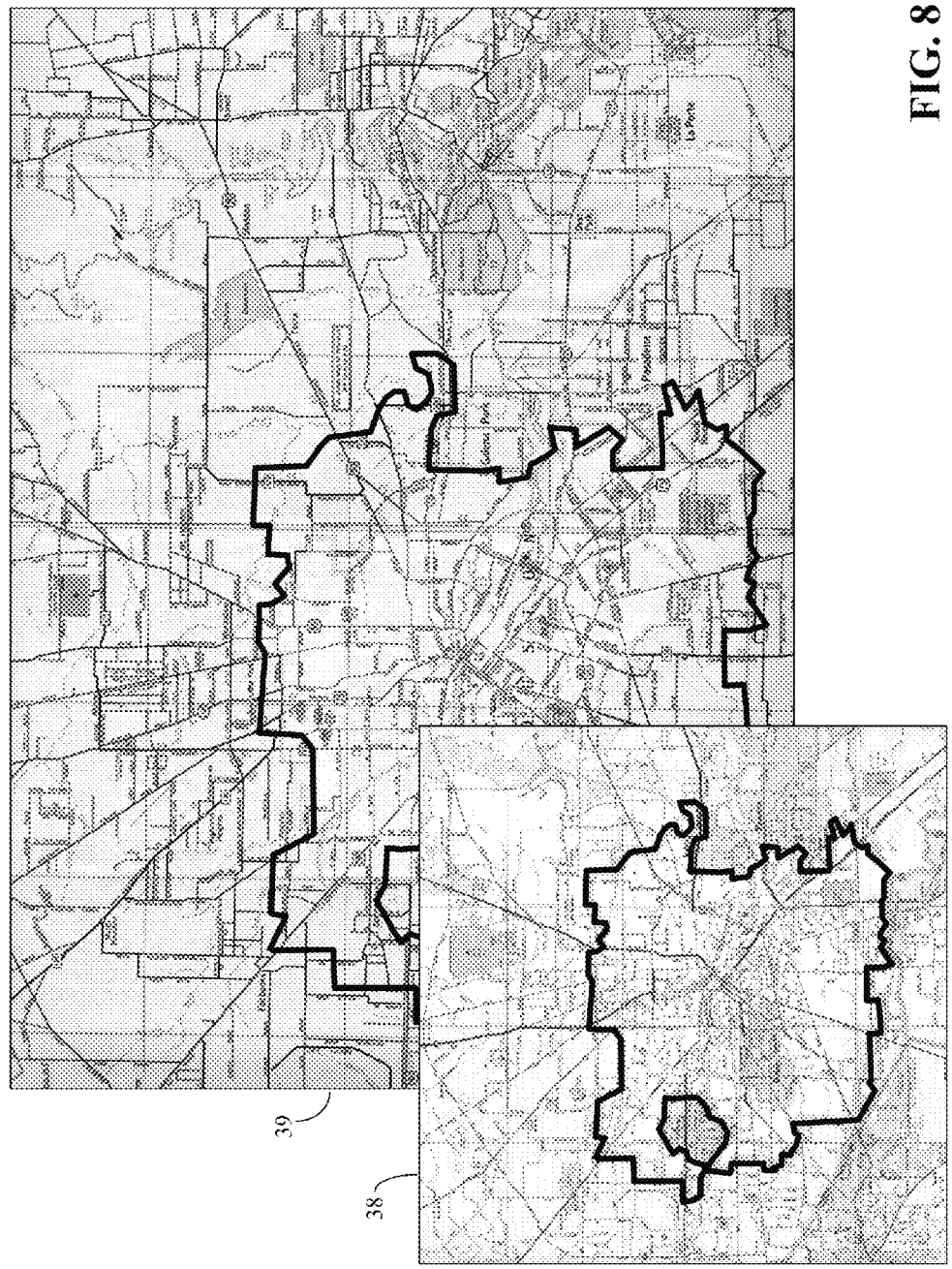
FIG. 8 illustrates an example of city map patterns.

Alternatively, as illustrated in FIG. 8, the present invention may be applied to non-biometric type of objects, such as street maps. The present invention may be used to quickly find a match between a portion of a small street map 38 (i.e., a specific item or query sample or test image), with a corresponding portion in a larger street map 39. The present invention, which is more fully explained below, may also be extended to any mapping of data of a given item class. For example, it may be applied to political maps, climate maps, or economic resource maps to identify a period in the past that most closely matches a current situation. The invention could also be applied to physical maps, road maps, and topographic maps.

Returning to the present example of vein pattern biometrics, a vein image recognition approach that is based on modeling the shape or geometrical layout of feature points is termed a generative model approach. A generative model is a model for randomly generating observable data, such as feature points. Generally, it specifies a joint probability distribution over observation and label sequences. In vein image biometric applications, the performance of the generative model is usually limited by segmentation error due to poor vein image quality.

Alternatively, the appearance of local image patches of a vein image can be modeled using the discriminative approach, such as used in a vocabulary tree model. In this types of application, discriminative models are typically used to model the dependence of an unobserved variable y on an observed variable x. Within a statistical framework, this is done by modeling a conditional probability distribution $P(y|x)$, which can be used for predicting y from x.

Generally, discriminative models differ from generative models in that discriminative models do not allow one to generate samples from a joint distribution of x and y. That is, a generative model can be used to simulate (i.e. generate) values of any variable in the model, whereas a discriminative model allows only sampling of the target variables conditional on the observed quantities.

The present invention proposes combining the discriminative and generative models to achieve results better than can be achieved with either model alone. This is done by extending the discriminative model approach to consider the geometrical alignment error of feature points under Bayesian inference theory. This makes the presently proposed algorithm/method/system both discriminative and generative. Experimental results show a superior performance of the present approach over either purely generative or purely discriminative approaches. As illustrated below, in a preferred embodiment, both the discriminative and the generative parts of the presently preferred approach are implemented using a common (vocabulary) tree model, which makes the present algorithm generic and efficient for problems other than biometric vein image recognition.

Biometrics, in general, involves receiving a test sample (i.e., a query sample/image) of a biometric feature, such as a finger print, and comparing the test sample with a registry of known (i.e., pre-registered) samples in an effort to find a match. Typically, the registry is built by registering known individuals and their corresponding, known biometric samples. Each individual that is to be registered, submits a true sample of a specific biometric, which then becomes his registered sample and is identified (i.e. associated) with that individual, such as by identification (ID) number. In this manner, the registered sample is known to correspond to (i.e., is registered to) a specific individual, and a person's identity can be confirmed by matching his/her newly submitted test sample(s) (i.e. query sample) to his/her registered sample(s).

In a typical biometric identification process, a submitted query sample of someone wishing to be identified (i.e., authenticated or verified) as a registered person is compared with a registry of registered samples. If a match is found, then the query sample is identified as corresponding to the registered person associated with the matched registered sample. If the person is not already registered within the registry of biometric samples, then the process should reject the person as unknown and not verified. Thus, the biometric identification process should only authenticate (i.e., recognize) registered persons.

Problems may arise when a query sample submitted for recognition is truly from a registered person, but the query sample is not identical to the person's registered sample due to various circumstances. For example, the testing device that acquires the query sample may not be as precise as (or may otherwise be different from, or provide a differently angled view or differently sized view or a partial view as) the device used to originally register the person. Additionally in the case of finger vein biometrics, a query sample may accidentally provide partial views of two adjacent fingers, and not provide a single view of any single finger. Variations may also be due to physiological changes in the registered person that cause his/her test sample to vary to some degree from the registered sample (i.e., the true sample previously used to register the person). In this case, the biometric algorithm should be flexible enough to allow for such variations, but still be sophisticated enough to avoid mistakenly verifying a person that is not in the registry. Much research has been made into various methods of precisely matching a submitted query sample to a library of registered sample, and avoiding false positives (i.e., erroneously authenticating a non-registered person) and false negatives (i.e. erroneously rejecting a person that is indeed already registered).

A critical step in finger vein recognition is thus to match the query vein pattern (i.e. the test image) to a database of registered fingers and their corresponding vein samples, wherein each finger in the database may be associated with a set of sample vein images. Many existing methods of pattern matching are based on converting a vein image into a shape representation and then performing shape matching. For example, Miura et al. in "Feature Extraction of Finger-Vein Patterns Based on Repeated Line Tracking and its Application to Personal Identification," Mach. Vis. Appl., 15, 2004, describe extracting the finger vein from an unclear image by using line tracking. Another approach put forth by Song et al. in "Finger-Vein Verification System Using Mean Curvature," Patt. Recogn. Lett, 32, 2011, propose a mean curvature method to represent the vein image as a geometric shape and to find valley-like structures with negative mean curvatures for matching. Another approach is provided by Hoshyar et al. in "Smart Access Control With Finger Vein Authentication and Neural Network," J. Am. Sci., 7:192, 2011, in which finger vein patterns are extracted by combining morphological operation and maximum curvature points in image profiles.

Since shape can also be represented by a geometric layout of feature points, vein recognition methods based on local feature matching have also been attempted. For instance, Yu et al. in "Finger-Vein Image Recognition Combining Modified Hausdorff Distance with Minutiae Feature Matching," J. Biomed. Sci. Eng., 2, 2009, illustrate extracting minutiae features for geometric representation of a vein shape and using a Hausdorff distance algorithm to evaluate possible relative positions of minutiae features. Similarly, Wang et al, in "Minutiae Feature Analysis for Infrared Hand Vein Pattern Biometrics," Pattern Recognition, 41, 2008, show applying the Hausdorff distance based scheme to analyze interesting points for vein recognition.

These methods rely on the assumption that the vein shape will remain generally consistent. But even if this assumption holds, segmentation errors due to poor finger vein image quality can still severely degrade the recognition accuracy of these methods. To overcome this problem, multi-biometric systems have been put forth. For example, J. Yang et al. in "A Novel Finger-Vein Recognition Method with Feature Combination," Proc. of ICIP'09, 2009, exploit finger vein features in local moments, topological structure and statistics for recognition. W. Yang et al. in "Personal Authentication Using Finger Vein Pattern and Finger-Dorsa Texture Fusion," Proc. of ACM MM'09, 2009 describe using a multimodal biometric approach to fuse the binary vein patterns and the normalized dorsal textures into one feature image for personal authentication. Methods based on score-level fusion have also been proposed. For example, B. Kang et al. in "Multimodal Biometric Method that Combines Veins, Prints and Shape of a Finger," Opt. Eng, 2010, show individually recognizing and then combining finger veins, fingerprints, and finger geometry features. A difficulty in a fusion based approach, however, is how to select optimal combination weights, especially when multiple modalities are considered, and how to handle the exponential growth of the feature space.

Matching methods based on shape consistency are generative approaches. In these matching methods, the shape similarity indicates the likelihood of observing the query image given a hypothesized object ID. The presently preferred embodiment shows that the discriminative approach can also be applied, where instead of considering a segment shape or the geometric layout of feature points, the appearance of individual local image descriptors (preferably SIFT descriptors, or feature points) can provide important information for recognition. In this way, algorithms in the image classification domain, such as the vocabulary tree model, can be applied. A discussion of the vocabulary tree model is provided by Nister et al. in "Scalable Recognition with a Vocabulary Tree," Proc. of CVPR'06, 2006, herein incorporated in its entirety by reference. The presently preferred embodiment further demonstrates the incorporating of geometric constraints into the discriminative framework, which makes it both discriminative and generative.

Figure 1:
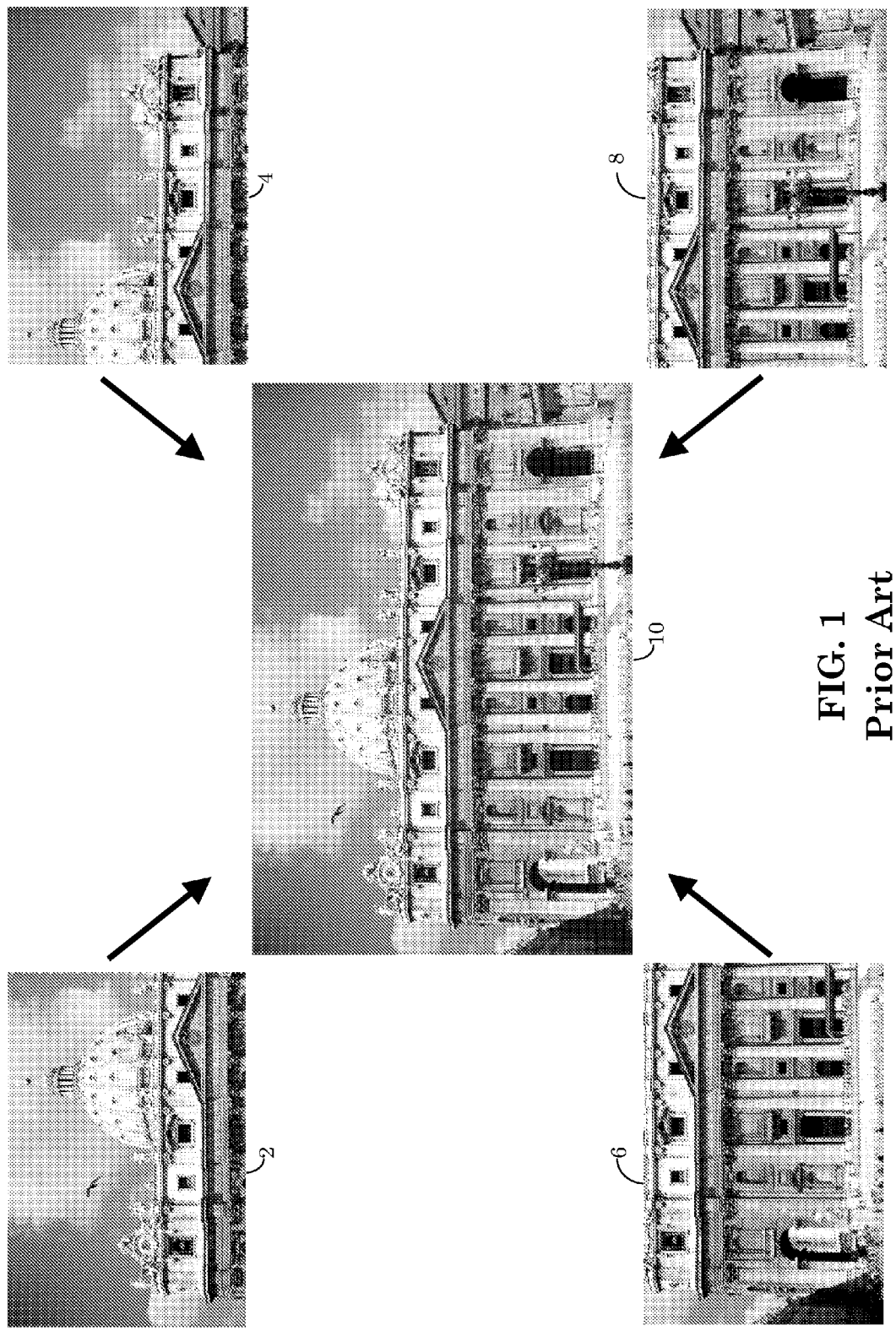
FIG. 1 illustrates stitching multiple images into a composite image by identifying corresponding feature points among the multiple images.
Figure 2:
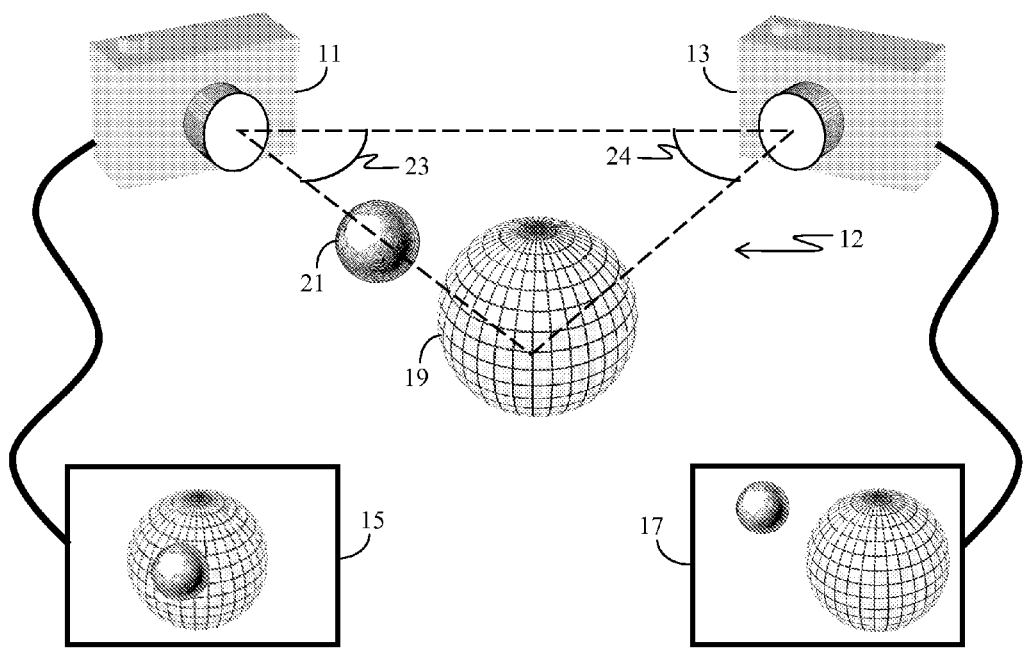
FIG. 2 illustrates the use of constrains to create a perspective image.
Figure 3:
FIG. 3 illustrates the identifying of SIFT item descriptors within an image.
Figure 4:
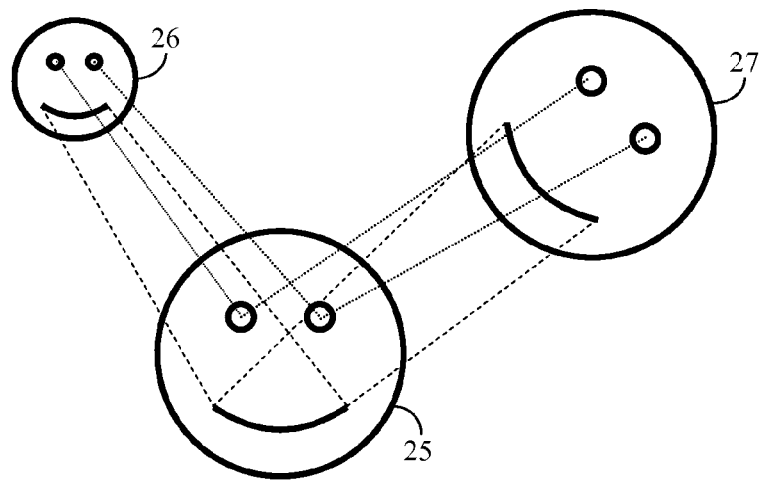
FIG. 4 illustrates geometric (i.e. size and rotation) transforms, specifically SIFT transforms, to match one object to another.
Figure 5:
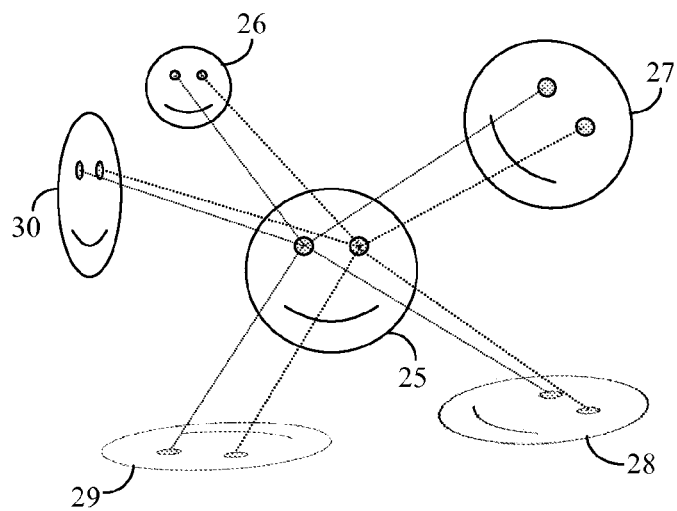
FIG. 5 illustrates the use of affine SIFT transforms to match objects.
Figure 6:
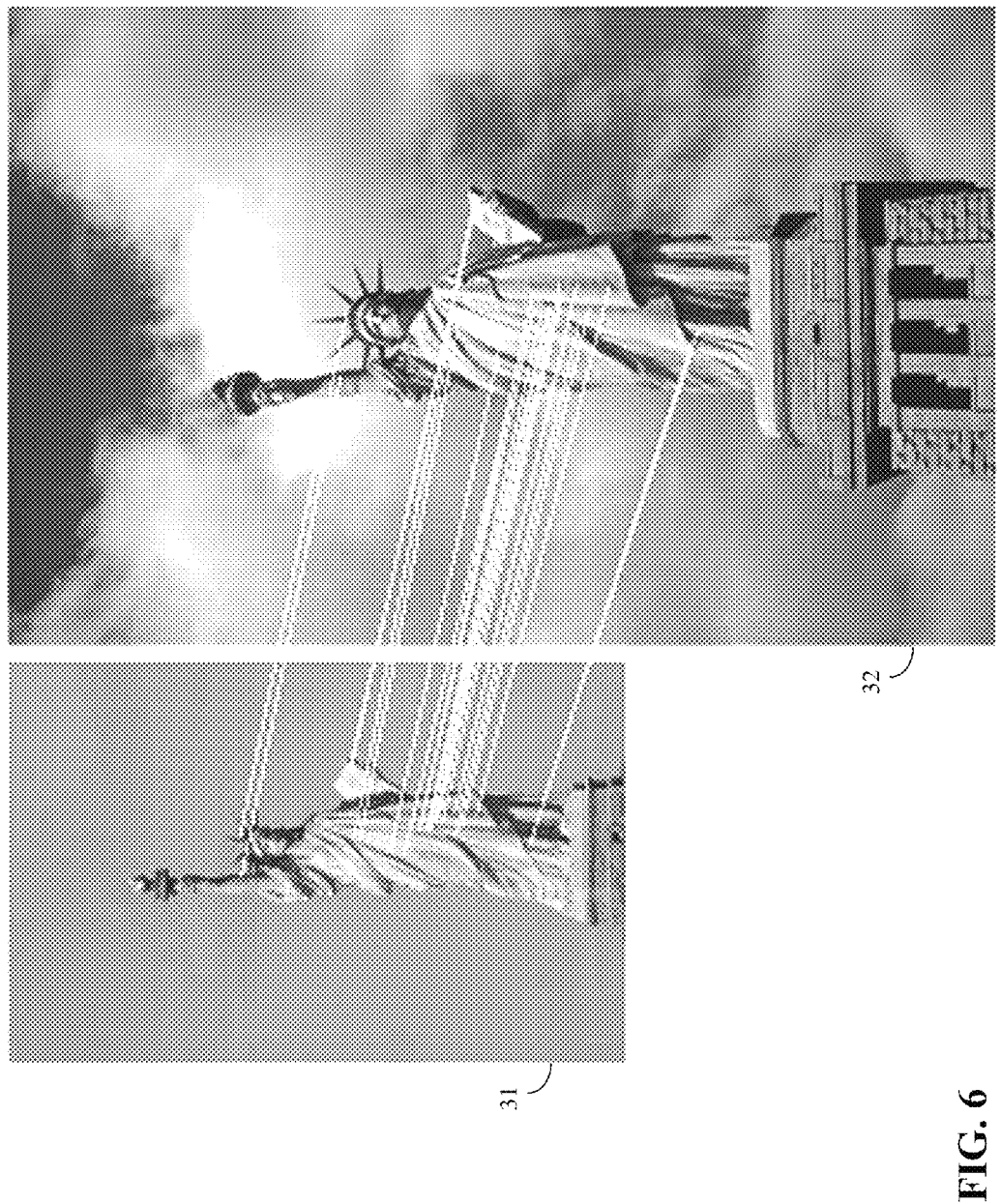
FIG. 6 illustrates the matching of feature points in one image to another.
Figure 9A:
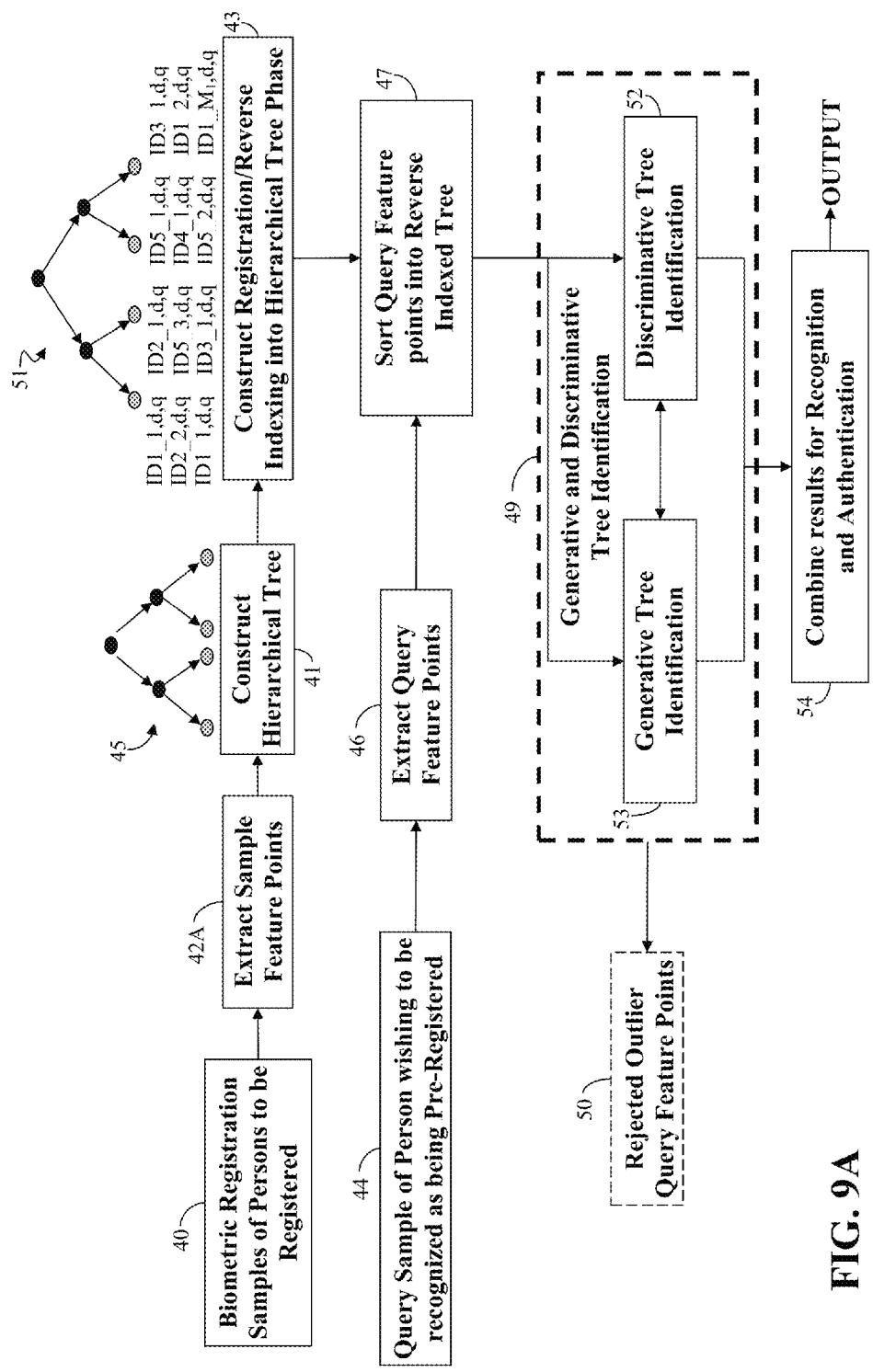
FIG. 9A provides a first overview of the present invention.
Figure 9B:
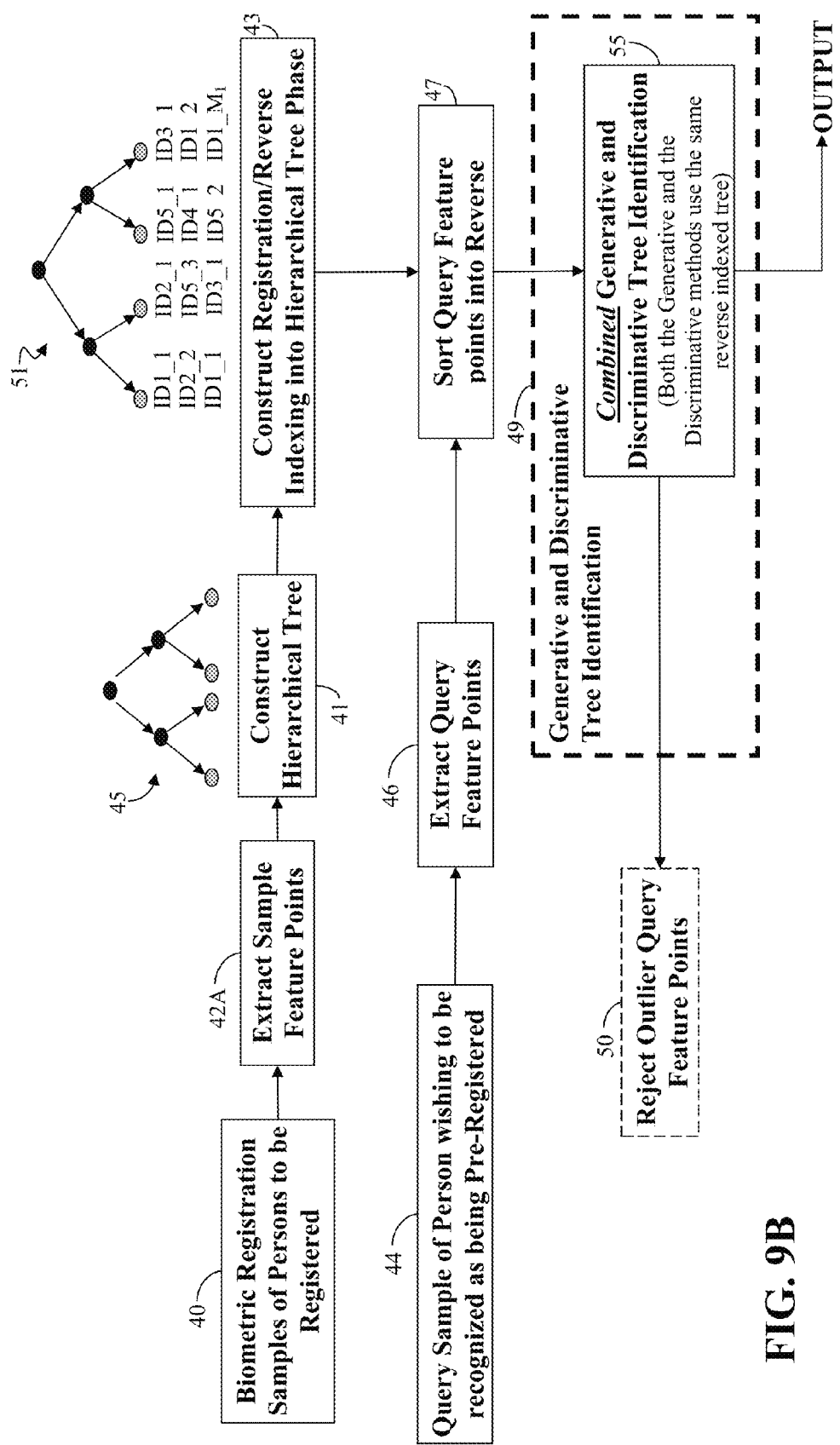
FIG. 9B provides a second overview of the present invention.
Figure 9C:
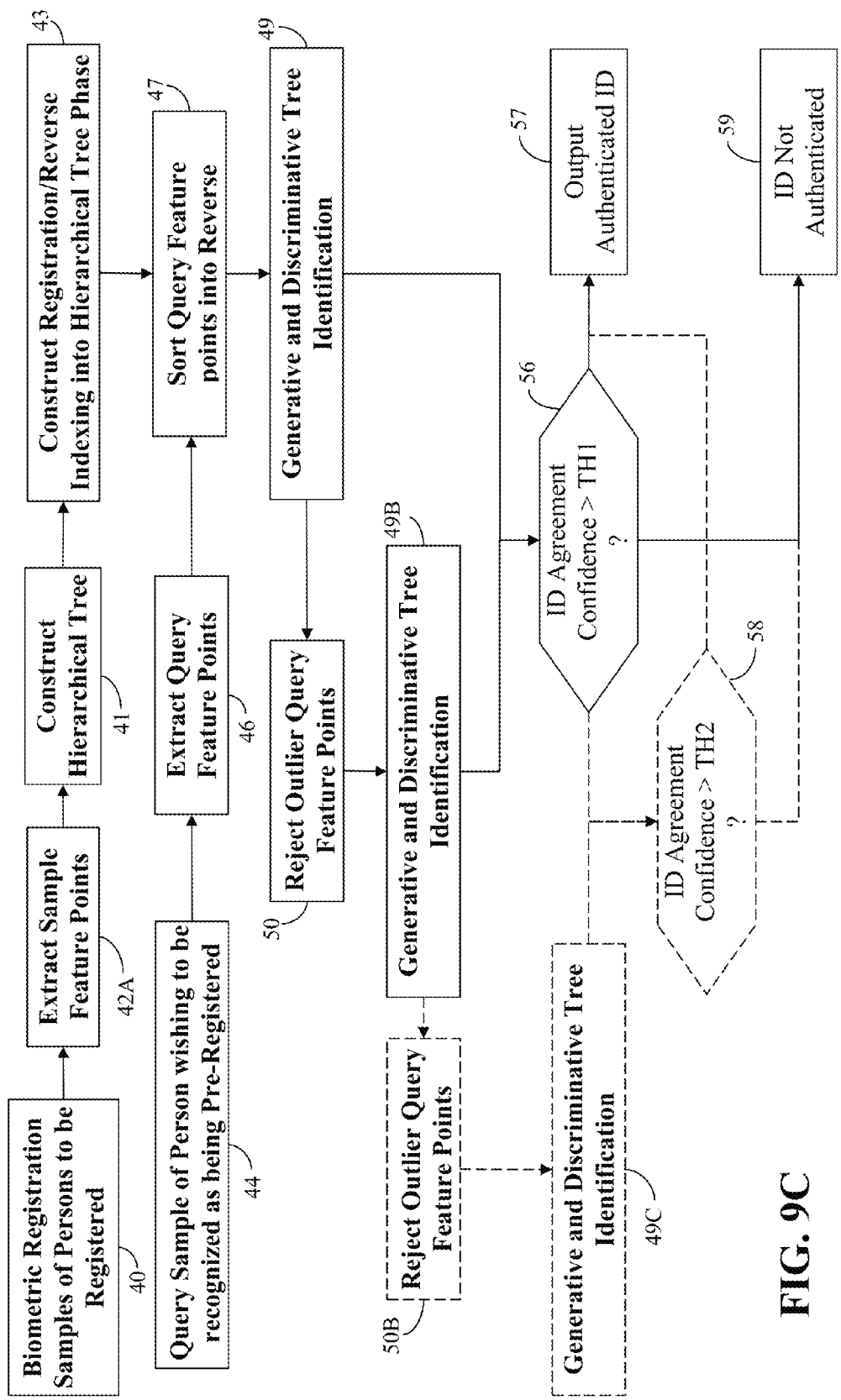
FIG. 9C provides a third overview of the present invention.

Various electronic data processing blocks (or method step blocks) of preferred embodiments of the present are illustrated in FIGS. 9A, 9B and 9C. With reference to FIG. 9A, a preferred embodiment of the present invention begins by collecting biometric samples of persons to be registered, as illustrated by block 40. Block 42A extracts feature points from each of the registration samples from block 40. Various techniques of feature point extraction are known the art, and the present example preferably uses SIFT feature point extraction, as illustrated above in reference to FIGS. 3-6. The SIFT transform is typically used to correlate similar objects in multiple images, but at this case, block 42A preferably uses the SIFT transform only to extract feature points (i.e. item descriptors) from each registration image, as illustrated in FIG. 3, and not to correlate feature points between registration images.

Since an objective of the SIFT's transform (or algorithm or mechanism) is to identify similar item descriptors in two, or more, images, it is clear that each item descriptor (i.e., feature point pixel in the present example) needs to be described sufficiently to make it highly distinguishable from others. This is achieved by using a number of descriptive characteristics (or descriptive data) to identify (i.e., to describe) each item descriptor. In a typical SIFT transform, each item descriptor is characterized by 128 pieces of descriptive data. That is, each item descriptor (i.e., feature point pixel, or pixel point, in the present example) may be thought of as a 128-dimension vector. In some embodiments, each of these 128 pieces of descriptive data may be represented by a respective data bit, and so each feature point (i.e. each descriptive pixel) may be uniquely identified by a 128-bit vector.

The extracted feature points (or item descriptors) of all the training images are then collected into a composite collection of item descriptors, and block 41 organizes this composite collection into a hierarchical tree structure according to relations (i.e. similarities) in the item descriptors. For example, these relations may be established by a k-means process, recursive k-means process, EM optimization process, agglomerative process, or other data clustering process. For illustrative purposes, a simplified hierarchical tree 45 having only 7 nodes (including 4 leaf nodes) is shown as constructed by block 41. In the present example, each of the leaf nodes would correspond to a group of item descriptors sharing some common relation, i.e., having some similar characteristic(s).

Following hierarchical tree construction block 41 is the registration/(reverse indexing) block 47, which uses the same set of biometric registration samples 40, and preferably the same extracted feature points from block 42A (although some other feature extraction method may be applied to generate a new set of feature points), to reverse index hierarchical tree 45 to each registered person. That is, biometric registration samples (i.e. registrable item samples) of each person to be registered, such as those provided by block 40, are submitted to registration/indexing phase block 47. Each registration sample includes an identification (ID) code identifying its corresponding person. Registration/reverse indexing block 47 preferably uses the same feature identification technique used by hierarchical tree construction block 41 (i.e. SIFT in the present example) to identify a separate, and corresponding, registrable set of item descriptors for each registration sample. Due to the intricacies of the SIFT algorithms, the registrable set of item descriptors identified/used by registration/indexing phase 47 may not necessarily be the same as (i.e., not identical to) those used by hierarchical tree construction phase 41.

In a preferred embodiment, however, both blocks 41 and 47 use the same biometric registration samples 40 and the same feature points extracted by block 42A. Registration/reverse-indexing block 47 distributes the registrable sets of item descriptors into hierarchical tree 45 according to the relations in the item descriptors established in the creation of hierarchical tree 45. That is, the registrable sets of item descriptors are preferably distributed using the same data clustering technique used by hierarchical tree construction block 41. As is explained above, biometric registration sample library 40 is comprised of a plurality of biometric samples (i.e., image samples) of each person to be registered, and each registration sample within library 40 preferably includes an identification code (ID) identifying (i.e., indexed to) its corresponding person. Each leaf node that receives any part of a registrable set of item descriptors also receives the ID code of (i.e. is reversed indexed to) the registered person to which the registrable set of item descriptors corresponds, which results in a reverse index hierarchical tree, as illustrated by tree 51.

To recapitulate, library 40 is used with both blocks 41 and 47, but serves a different purpose in each block. When used with the hierarchical tree construction block 41, biometric sample library 40 serves as a training library identifying and organizing characteristic features of the particular biometric type into a sorting tree structure, such as illustrated by simplified hierarchical tree 45. When used with registration/reverse-indexing block 47, biometric sample library 40 serves as a registration library to reverse index (or register) information clustered into the hierarchical tree to the persons being registered, which results in a reverse index tree, such as illustrated by simplified reverse index tree 51. In a sense, registration/indexing phase 47 attaches a probability measure to each leaf node, which indicates the probability of a registered person having a portion of his/her characteristic feature(s) sorted into that leaf node.

For ease of discussion therefore, when biometric sample library 40 is used in conjunction with hierarchical tree construction block 41, it will be termed a "training library 40". Similarly, any samples or item descriptors used in hierarchical tree construction block 41 may be termed training samples and training item descriptors, respectively. But when biometric sample library 40 is used in conjunction with registration/reverse-indexing block 47, it will be termed a "registration library 40." Similarly, any samples or item descriptors used in registration/indexing block 47 may be termed registration samples and registration item descriptors, respectively.

Returning to the presently preferred embodiment, when preparing biometric sample library 40, it is preferred that a person to be registered provide more than one sample of a given biometric type, and that each of the provided biometric samples be indexed to the same person, such as in a many-to-one manner. An example of this may be the case where multiple vein images of the same finger (or multiple fingers) from the same person are provided. For instance, if the multiple images of a finger (or of each of multiple fingers) are provided, then each of the multiple images would constitute a different registration biometric sample from the same person, the composite of multiple images would form a set within library 40 corresponding to the same person. The different biometric image samples within this set may be taken from different angles (including overlapping views) of the same finger, or from different portions (including overlapping portions) of the same finger and/or same directional view. For example, one biometric sample may be a front vein view of a finger, another may be a left vein view of the same finger, a third a right vein view of the same finger, and another a corner vein view of the same finger overlapping the front vein view with either of the left or right vein views. This approach is advantages because when the registered person later wants to be recognized as being pre-registered, he/she would create a new query biometric sample to compare with the registered biometric samples, and it is likely that the query biometric sample may not match exactly the view direction of any of the registered biometric samples previously provided. However, if multiple registration biometric samples from multiple views are provided, their composite information is more likely to match at least a part of the query biometric sample.

A more detailed discussion of hierarchical tree construction block 41 is provided in reference to FIGS. 10 to 14. In the present example, the objective is to cluster characteristic feature data hierarchically into a tree structure using a method such as k-means or canopy clustering.

Figure 10:
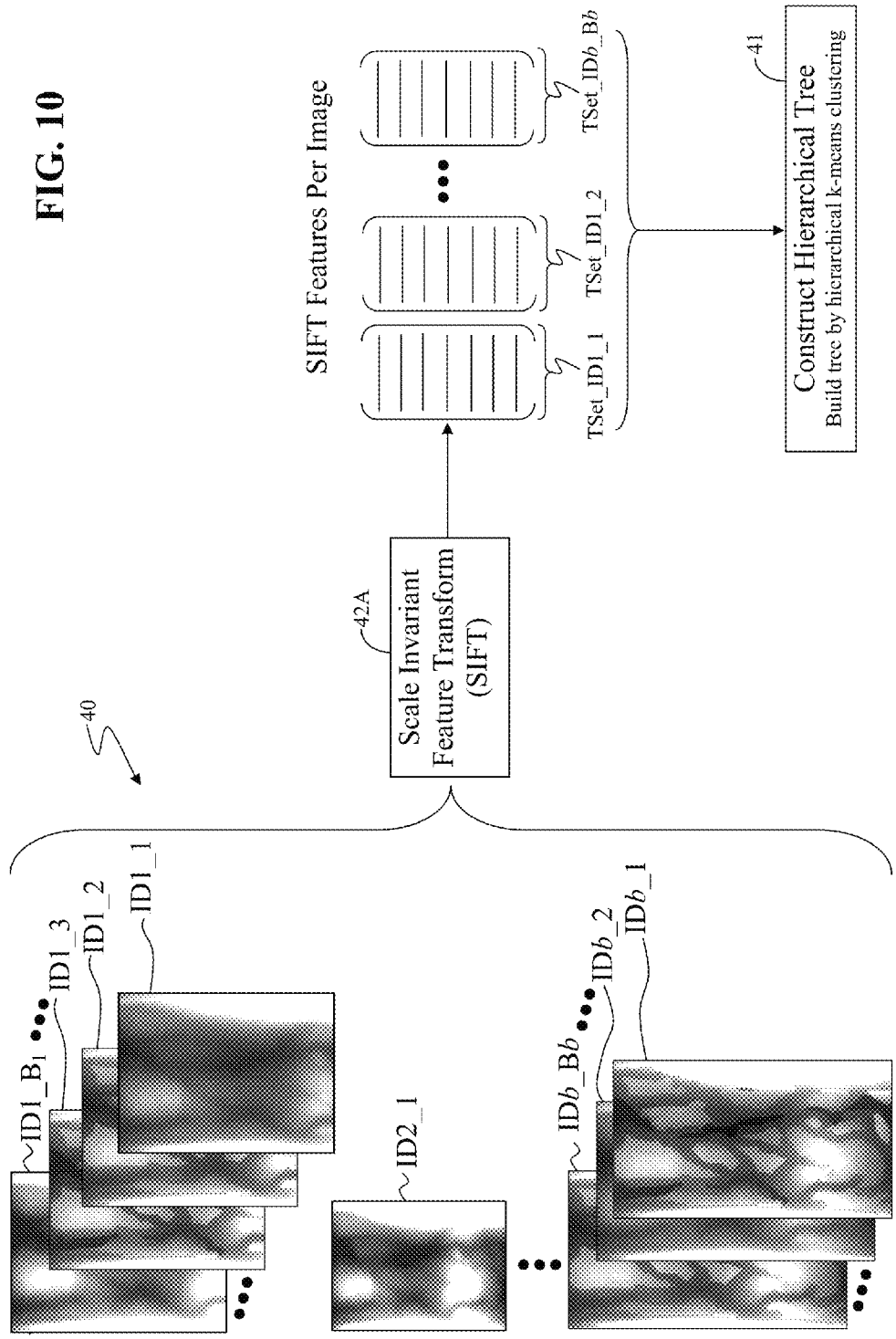
FIG. 10 illustrates the extracting of training SIFT item descriptors from training images.

With reference to FIG. 10, training library 40 provides its sets of biometric samples for construction of the hierarchical tree. As is explained above, each person being registered may provide one ore more biometric samples. For ease of illustration, each of b persons to be registered is assigned a distinct numeric identification code, ID1 through IDb. For ease of illustration, each of multiple biometric samples provided by the same person is further identified with that person's ID plus a sequential numeric index. For example, if person ID1 provides four biometric samples, then his/her biometric samples would be identified as ID1_1, ID1_2, ID1_3, and ID1_4. Since the total number of biometric samples provided by each person to be registered may be different, this indefinite number is herein identified as "B" plus a subscript identifying the numeric ID of the person to which it corresponds. For example, if person ID3 provides $B_3$ total biometric samples, then these biometric samples would be identified as ID3_1, ID3_2, ID3_3, . . . ID_$B_3$, and If person ID5 submitted $B_5$ samples, then his/her samples would be identified as ID5_1 through ID_$B_5$. Following this nomenclature, training library 40 shows that person ID1 provided biometric samples ID_1 through ID1_$B_1$, person ID2 provided only one biometric sample (ID2_1), and so on up to the last person IDb, who provided IDb_Bb biometric samples.

Each of training images ID1_1 though IDb_Bb is a true biometric sample image of the desired biometric type (or other item class) taken from the person who is to be registered. In the present example, the biometric type is a finger vein map, such as can be obtained by means of an IR camera sensor. In order to identify and categorize similarities between the training images ID1_1 though IDb_Bb, training library 40 is submitted to an application to identify a set of item descriptors per biometric sample. In the present example, this is achieved by means of a scale-invariant feature transform (SIFT) processing block 42A, which outputs a separate training set of item descriptors (TSet_ID1_1 to TSet_IDb_Bb) for each of biometric samples ID1_1 though IDb_Bb, respectively. Preferably, each training set of item descriptors TSet_ID1_1 to TSet_IDb_Bb consists of common number, Z, of item descriptors, but if desired, their number of item descriptors may differ.

The separate training sets of item descriptors RSet_ID1_1 to RSet_IDb_Bb are then submitted to block 41, which as explained in reference to FIG. 9A, collects all the feature points into a composite collection of training item descriptors and organizes them into a hierarchical tree structure according to relations (similarities) in the item descriptors.

Figure 11:
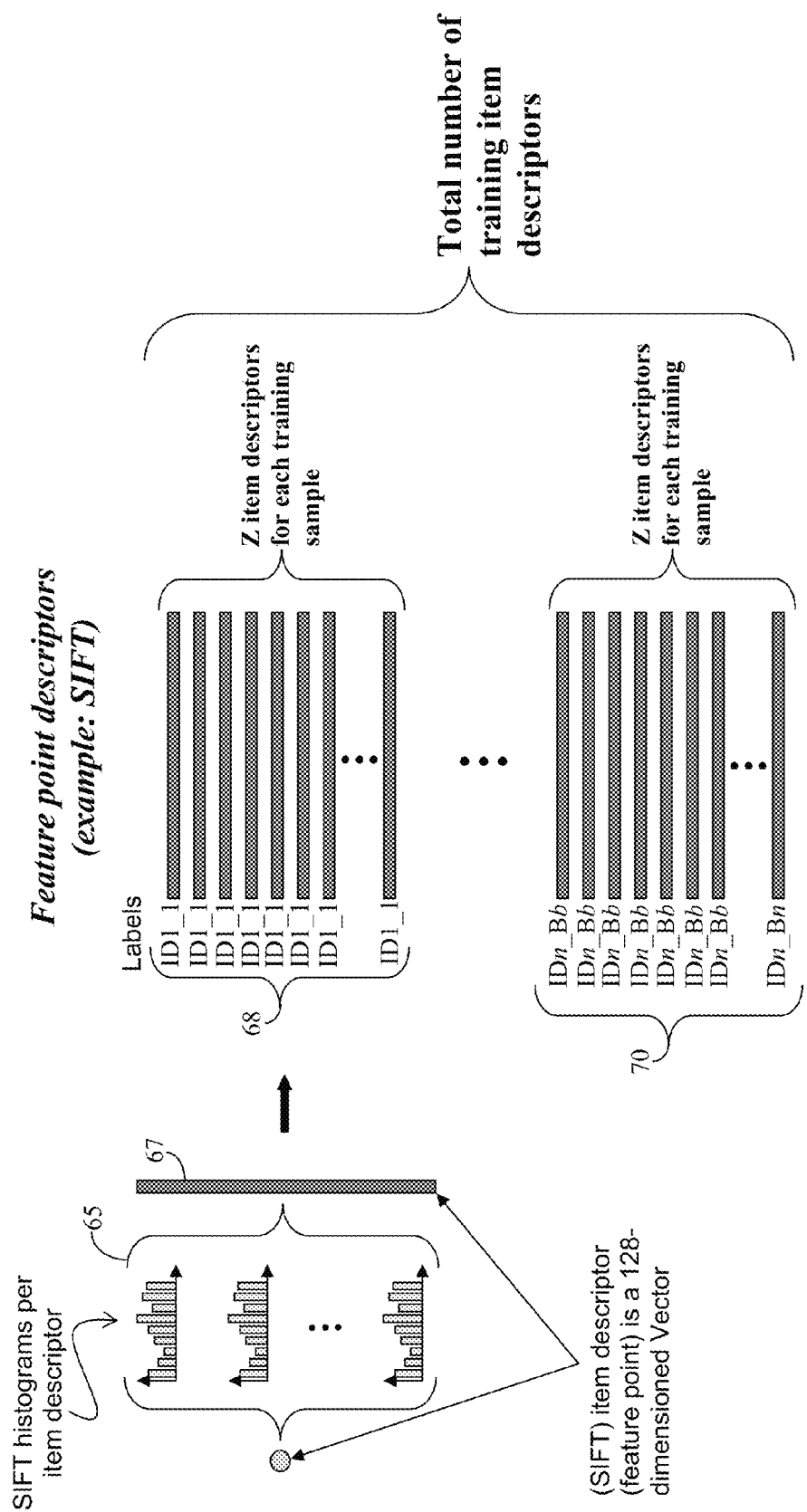
FIGS. 11 to 14 illustrate the construction of a hierarchical tree using the SIFT item descriptors from FIG. 10.

A quick overview of SIFT feature point extraction block 42A is illustrated in FIG. 11. As is known in the art, a typical SIFT processing algorithm creates a series of SIFT histograms 65 to describe each identified item descriptor (or feature point or SIFT descriptor). Each of SIFT histograms 65 statistically describes a distinguishing characteristic of the item descriptor relative to a neighborhood of pixels (or pixel window) surrounding the item descriptor in the image being processed. The series of SIFT histograms 65 are then collected into one vector 67, which constitutes one item descriptor. Each vector 67 describes a single item descriptor (i.e., a feature point or characteristic feature or (feature) pixel) and consists of 128 pieces of descriptive data. Thus, each item descriptor is characterized (i.e., described) by a 128-dimensioned vector 67.

The item descriptors may be labeled to identify the training sample image from which they were extracted. In the present example, group 68, is the group (or set) of item descriptors from first biometric sample image ID1_1, and group (or set) 70 is the group of item descriptors from the last biometric sample image IDb_Bb. The SIFT descriptors corresponding to any given biometric sample constitutes a set of item descriptors for that training image. For example, biometric sample image ID1_1 is shown to have a set of Z item descriptors. If desired, all images may be made to have the same number, Z, of item descriptors. In this case, all training images (i.e., all biometric sample images) would each have a set of Z item descriptors.

Figure 12:
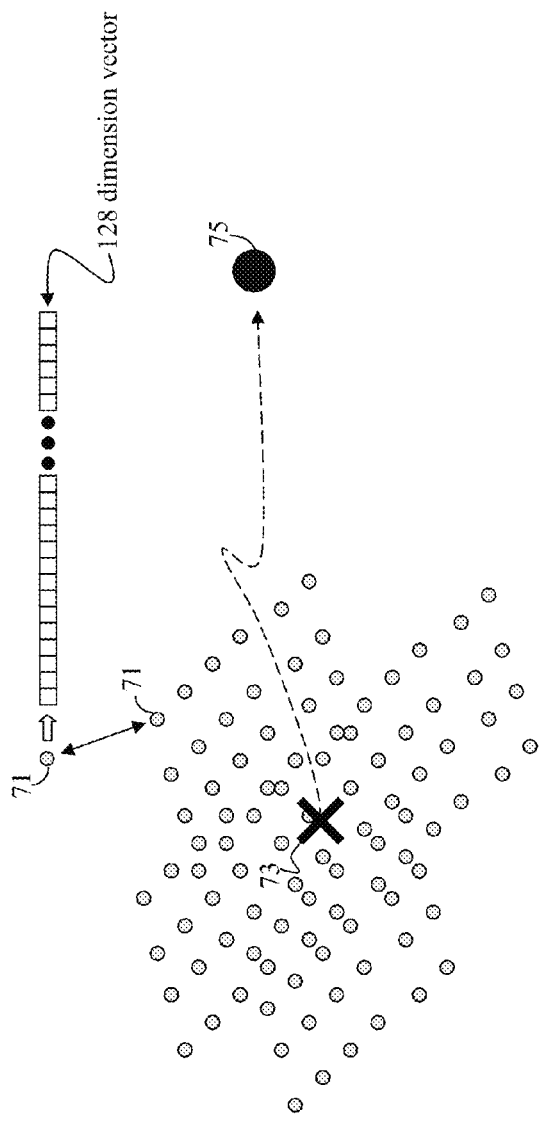

In the presently preferred embodiment, all the sets of items descriptors are collected into a composite collection of item descriptors, which is then used to construct a hierarchical tree, as described above in reference to block 41. One method of achieving this is through a recursive k-means application, as is illustrated in FIGS. 12-14.

With reference to FIG. 7, although each item descriptor, such as point 71, is a 128-dimension vector, for ease of illustration a clustering of lower-dimensioned item descriptors under a single center (preferably the mean value) is shown. This mean value point 73 may define the root node 75 of the hierarchical tree that is to be constructed.

Figure 13:
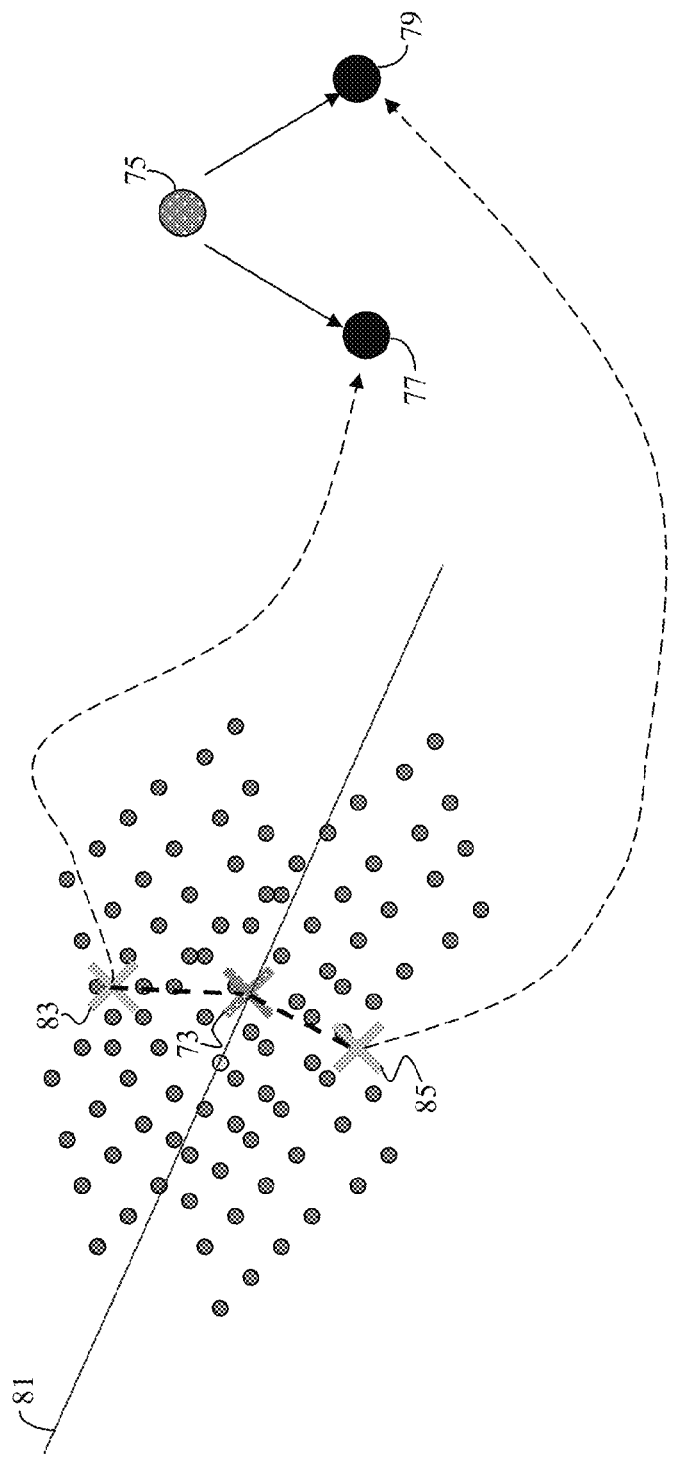
Figure 14:
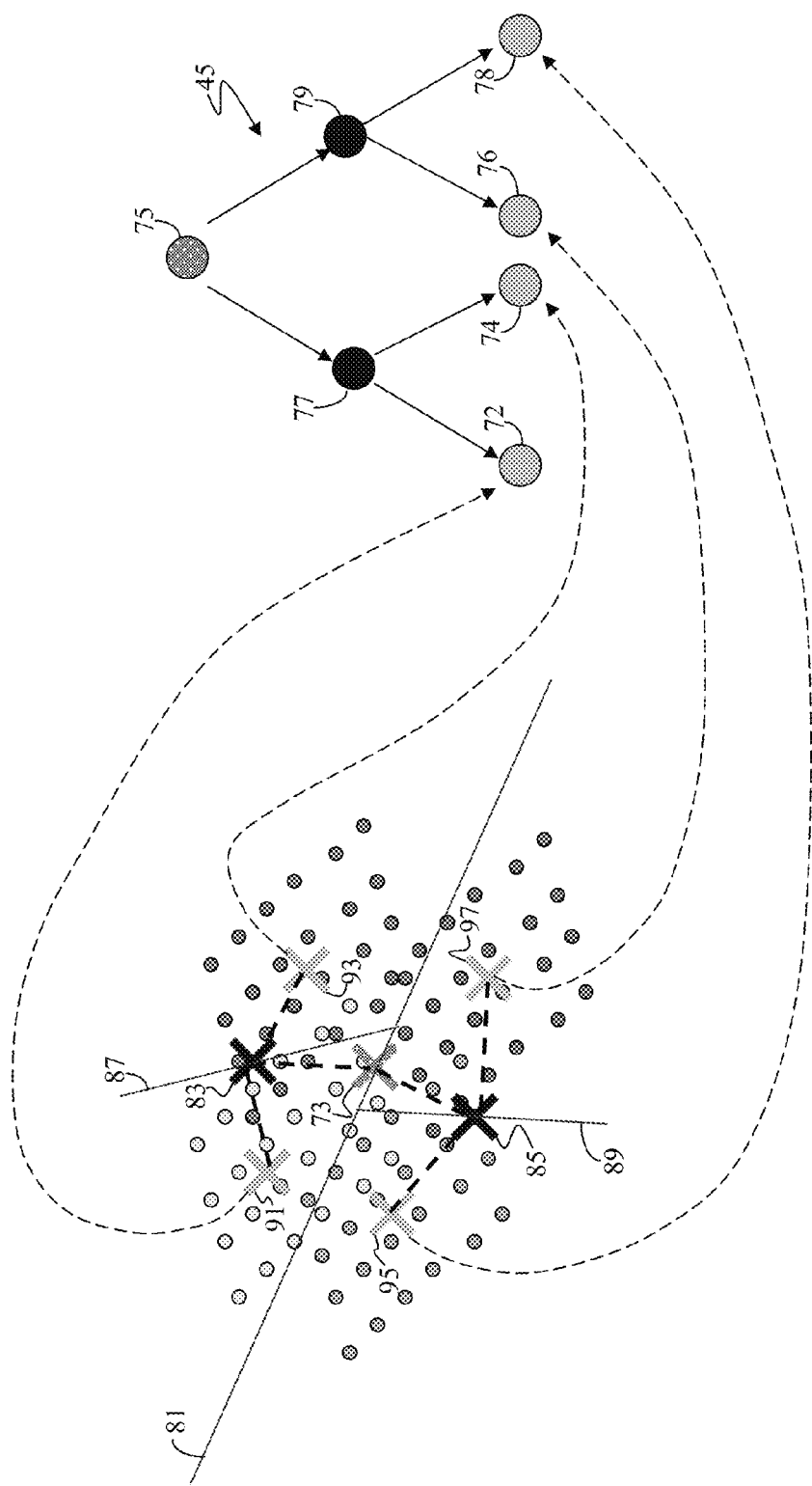

As illustrated in FIG. 13, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be defined by the mean of their respective groups of data. Each of center points 83 and 85 may define respective child-nodes 77 and 79 under root node 75. With reference to FIG. 14, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e., the difference) between data within a group is not greater than a predefined maximum.

In a hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. A node along a path downward from the root node to a leaf node may be termed a "path node" or an "intermediate node". Thus, in the example of simplified hierarchal tree 45, node 75 is the root node, nodes 77 and 79 are intermediate nodes (i.e., nodes linked to a parent node above them and linked to a child node below them), and nodes 72, 74, 76 and 68 are leaf nodes (i.e., nodes linked to a parent node above them, but with no child nodes below them).

Returning to FIG. 9A, after block 41 constructs the hierarchical tree (as illustrated by simplified hierarchical tree 45), the next step is to construct a reverse indexed hierarchical tree, as illustrated by block 47 (i.e. circuit block or method-step block). For ease of discussion, the simplified hierarchical tree 45 is used to illustrate the principles of registration/reverse-indexing block 47. Basically, users are registered by recording label information (i.e. recording a reverse index, RI) at leaf nodes that receive any part of an item descriptor from a registration biometric sample (i.e. a registration image). Thus, this registration step creates a reverse Index (RI) for each leaf node, and the RI (or RI label information) at each leaf node records information about all IDs with at least one descriptor that reaches the leaf node and further preferably records information about the specific descriptors that reaches the leaf node, as well. That is, the RI label information of at each leaf node includes not only the identification (ID) code that identifies (i.e. is indexed to) the registration biometric sample and its corresponding registered person from which the item descriptor (i.e. feature point) was obtained, but also includes geometric information of the feature point as determined during its extraction from the registration biometric sample, such as extracted by the SIFT application explained above. For example, the RI label information may include geometric information such as the (x,y) location and orientation information (and optionally momentum information) of each feature descriptor (i.e. each SIFT descriptor) at each leaf node. As is explained more fully below, the RI label information may further optionally include a path vector dli for each registration image (or training image if at least some training images are used as registered image) ID (or equivalently, each registration image/that identifies the registration-image/training-image) that reaches the leaf node i. Thus at each leaf node, each registration (or training) image with label/can be converted into a "path vector" dli at leaf ni. The dimension of dli at each leaf node equals the depth of leaf node ni in the tree. A simplified description of the creation of reverse-index tree 51 is provided in FIGS. 15-17.

Figure 15:
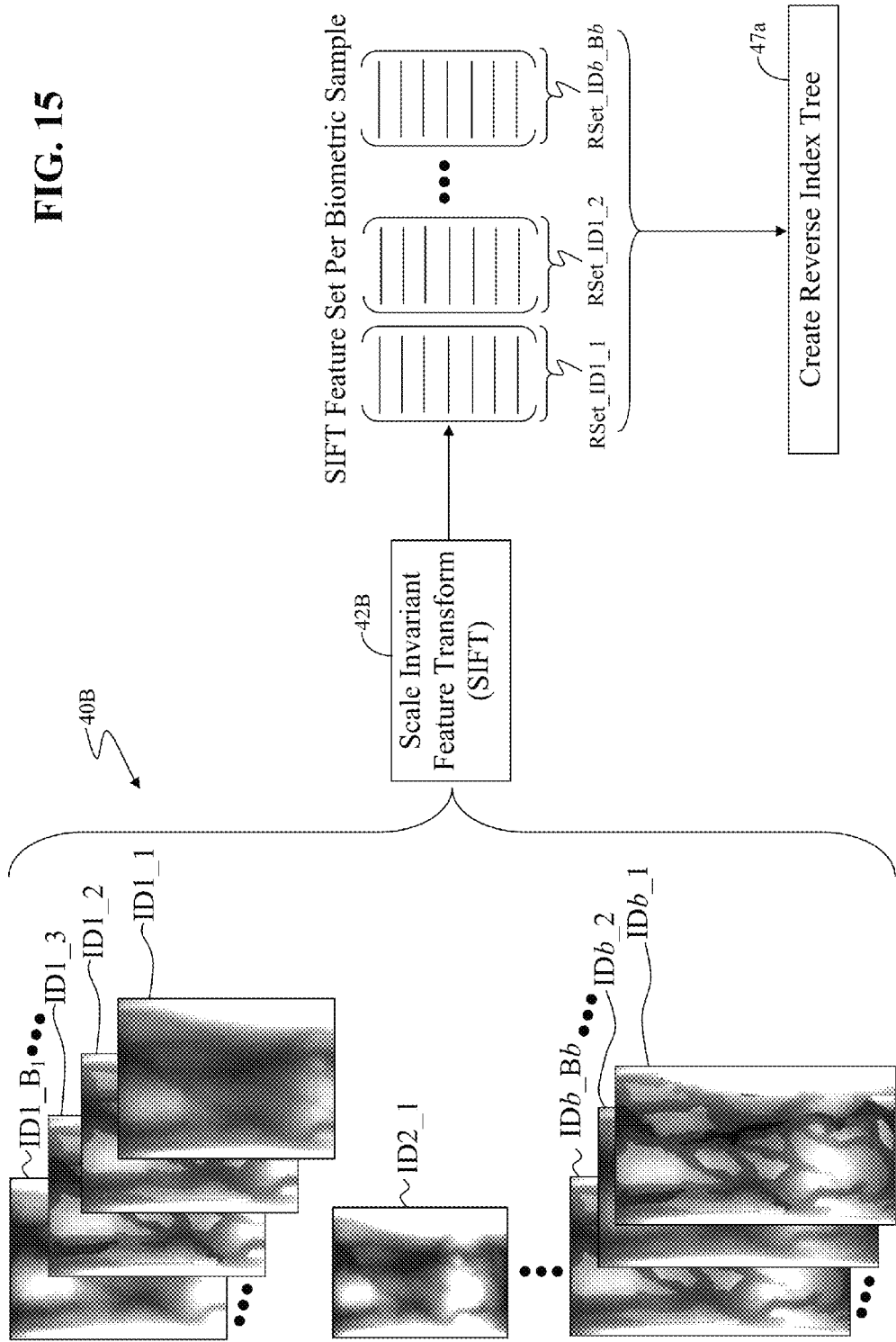
FIG. 15 illustrates the extracting of registration SIFT item descriptors from registration images.

With reference to FIG. 15, where all elements similar to those of FIG. 10 have similar reference characters and are described above, the registration biometric samples, or registration images, (collectively identified as registration library 40B) includes at least one biometric sample per person that is being registered. The registration images are not necessarily identical to the training images, but the registration images may optionally include all or part of the training image. The registration images may further optionally be all different from, or optionally be identical to, the training images. In the present example, the biometric type is a finger vein map, as is explained above. As before, each of the biometric samples (i.e., registration samples, registration images or registrable item samples) ID1_1 to IDb_Bb is submitted to a characteristic feature identification/extraction application 42B to identify a registration set of item descriptors for each biometric sample. Preferably, registration/reverse-indexing block 47 of FIG. 9A uses the same type of feature identification application as was used in hierarchical tree construction block 41. Thus, registration/reverse-indexing block 47 may use a scale-invariant feature transform (SIFT) processing block 42b, which outputs a separate registration set of item descriptors, RSet_ID_1 to RSset_IDb_Bb, for each of biometric sample, ID1_1 to IDb_Bb, respectively. If desired, the training set of item descriptors TSet_ID1_1 to TSet_IDb_Bb produced by SIFT feature point extraction block 42A may be used in place of registration set of item descriptors RSet_ID_1 to RSset_IDb_Bb. In this case, it is not necessary to use a second implementation of a feature extraction block, such as block 42b. That is, scale-invariant feature transform (SIFT) processing block 42b may be replaced by scale-invariant feature transform (SIFT) processing block 42a so that both blocks 41 and 47 use the same feature point sets produced by scale-invariant feature transform (SIFT) processing block 42a. Irrespective of how registration set of item descriptors RSet_ID_1 to RSset_IDb_Bb are obtained, it is preferred that each of the registration sets of item descriptors RSet_ID_1 to RSset_IDb_Bb consists of Z item descriptors.

The registration sets of item descriptors RSet_ID_1 to RSset_IDb_Bb are submitted to Create Reverse Index Tree block 47a, where they are distributed (i.e. clustered) into hierarchical tree 45 to create reverse-indexed hierarchical tree 51. Each leaf node of hierarchical tree 45 that minimally receives any part of a registration set of item descriptors also receives the ID code (i.e. label l) of the registration biometric sample (and person) corresponding to that registration set of item descriptors, and further preferably receives geometric information of the received feature point. This information becomes part of the RI label information for that node. Basically, each leaf node represents a group of data, and the RI label information assigned (i.e. indexed) to a leaf indicates the identification of the registered person whose feature descriptor(s) is represented within that leaf node's corresponding group of data, and further provides geometric information about the item descriptor. That is, the RI label information of each leaf node preferably identifies the registration sample's corresponding person and geometric information of the received feature point. As stated above, each RI label information may optionally also include a path vector dli for the received registration image (or training image).

The result of distributing the registration sets of item descriptors RSet_ID_1 to RSset_IDb_Bb into hierarchical tree 45, is reverse indexed hierarchical tree 51. The principle of this process of populating the leaf nodes of hierarchical tree 45 and creating the RI label information to construct registered (i.e. reverse index) hierarchical tree 51 is illustrated in FIGS. 16 and 17.

Figure 16:
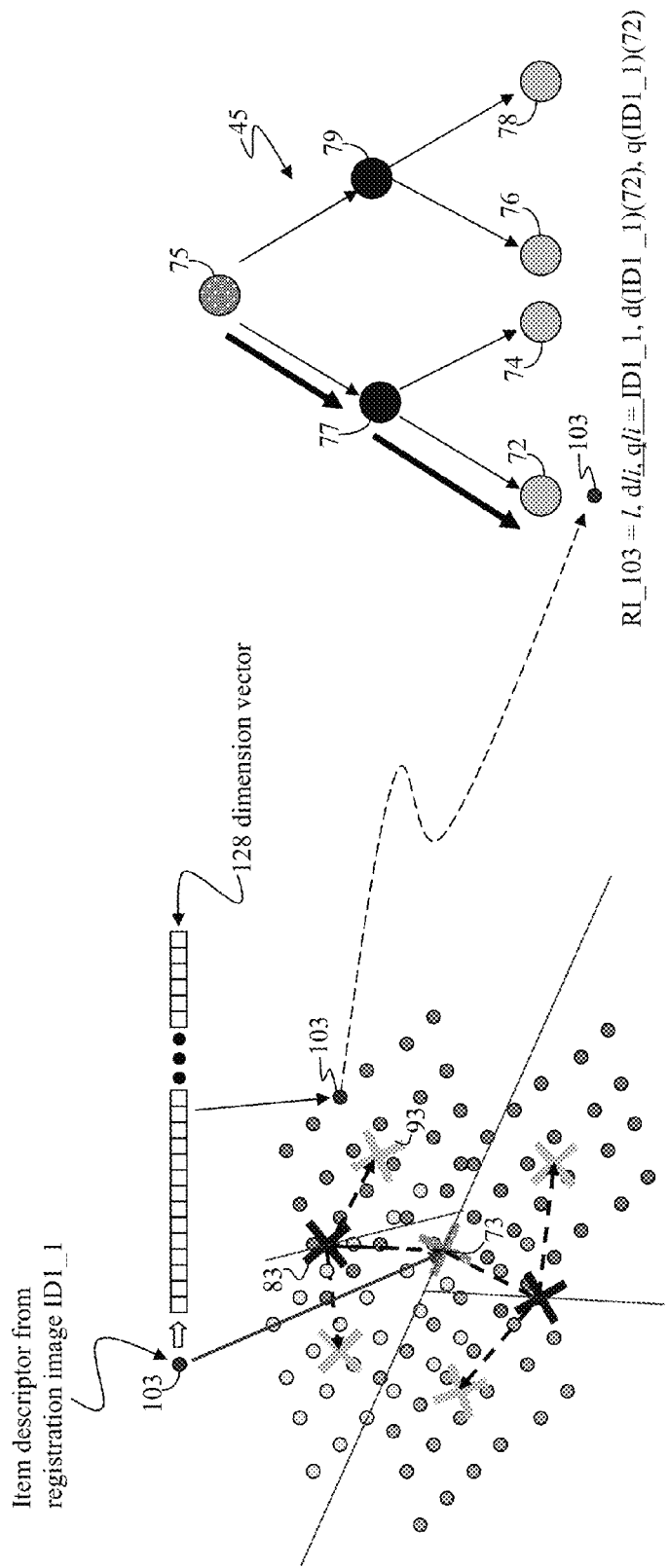
FIGS. 16 and 17 illustrate the construction of a reverse index tree based on the hierarchical tree of FIG. 14.

With reference to FIG. 16, item descriptor 103 from biometric sample ID1_1 is distributed into the data cluster that defined hierarchical tree 45. Like before, item descriptor 103 is a 128-dimension vector. In the present example, it is assumed that item descriptor 103 distributes/sorts into the data group defined by center point 93. As is explained above, center point 93 corresponds to leaf node 72. Consequently, item descriptor 103 is distributed to leaf node 72, and leaf node 72 receives (i.e. is assigned or indexed to) the ID code (or label or index) of the registration biometric sample to which item descriptor 103 belongs. Thus, the RI label information of leaf node 72 receives the label l identifying the training image from which item descriptor 103 was extracted (i.e. l=ID1_1). Preferably, the RI label information RI_103 of item descriptor 103 also includes the path vector dli that biometric sample ID1_1 followed to reach leaf node 72. Since in the present case l=ID1_1 and i=leaf node 72, path vector dli is identified as d(ID1_1)(72). In the present illustration, the variable q is preferably used to generically refer to a item descriptor (i.e. feature point). Thus, the geometric information of item descriptor 103 may identified by notation qli. In the present example, the geometric information of item descriptor 103 would be identified by notation q(ID1_1)(72). Notation q may also uniquely identify item descriptor 103.

For the sake of completeness, FIG. 16 also shows that item descriptor 103 starts at center point 73, which corresponding to root node 75. Its distribution path then goes from center point 73 to the data group defined by center point 83 (corresponding to a path from root node 75 to intermediate node 77), and from center point 83 to the area defined by center point 93 (corresponding to a path from intermediate node 77 to leaf node 72). The distribution path of each item descriptor is preferably defined by similar rules that defined the data cluster of training data (i.e. recursive k-means).

Figure 17:
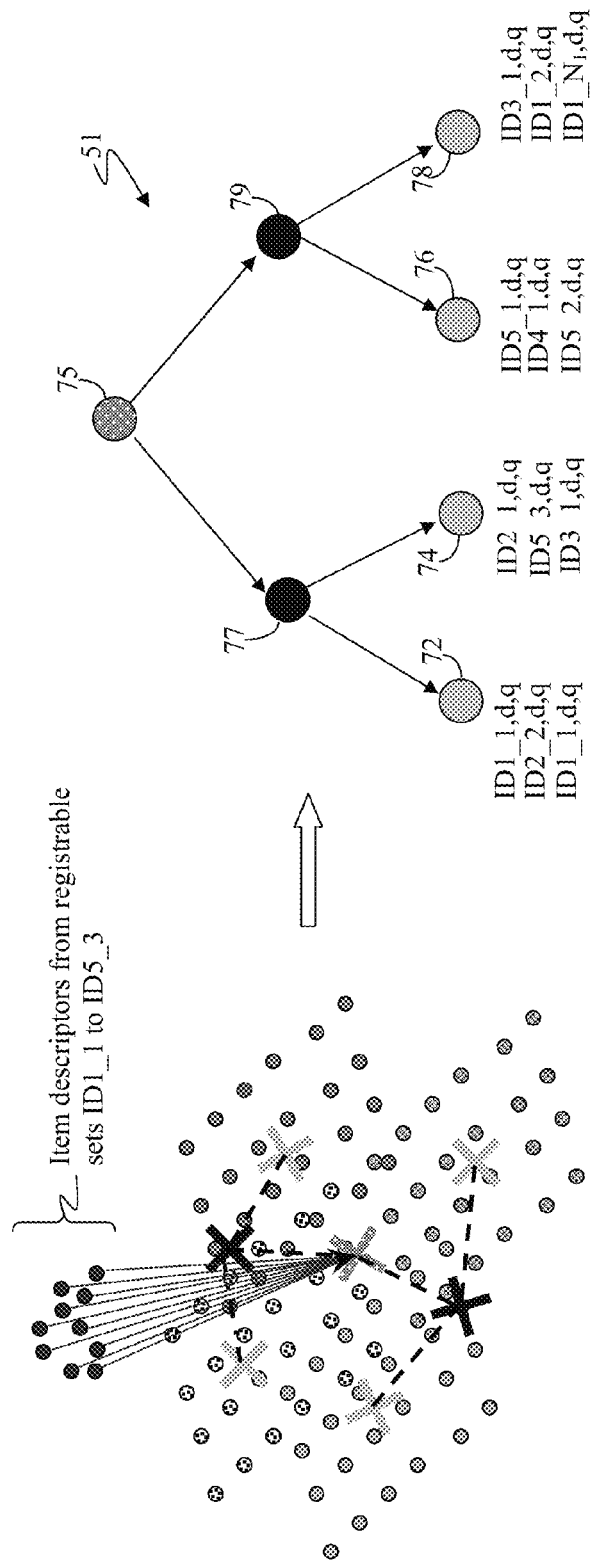

With reference for FIG. 17, the results of distributing 10 item descriptors from five registration sets of item descriptors is illustrated. This results in reverse index hierarchical tree 51. Because of limited space in the drawing, the full RI label information of each of the 10 item descriptors is not shown. Only the ID's of the registration images ID1_1 through ID5_3, and place holders for the path vector "d" and feature point geometric information "q" are shown. It is to be understood that the full RI label information of each item descriptor would preferably follow the format of item descriptor 103 (i.e. RI_103) from FIG. 16. It is further to be understood that a real-world application could have many more registration sets of item descriptors and each set could have hundreds or thousands of item descriptors.

Figure 18:
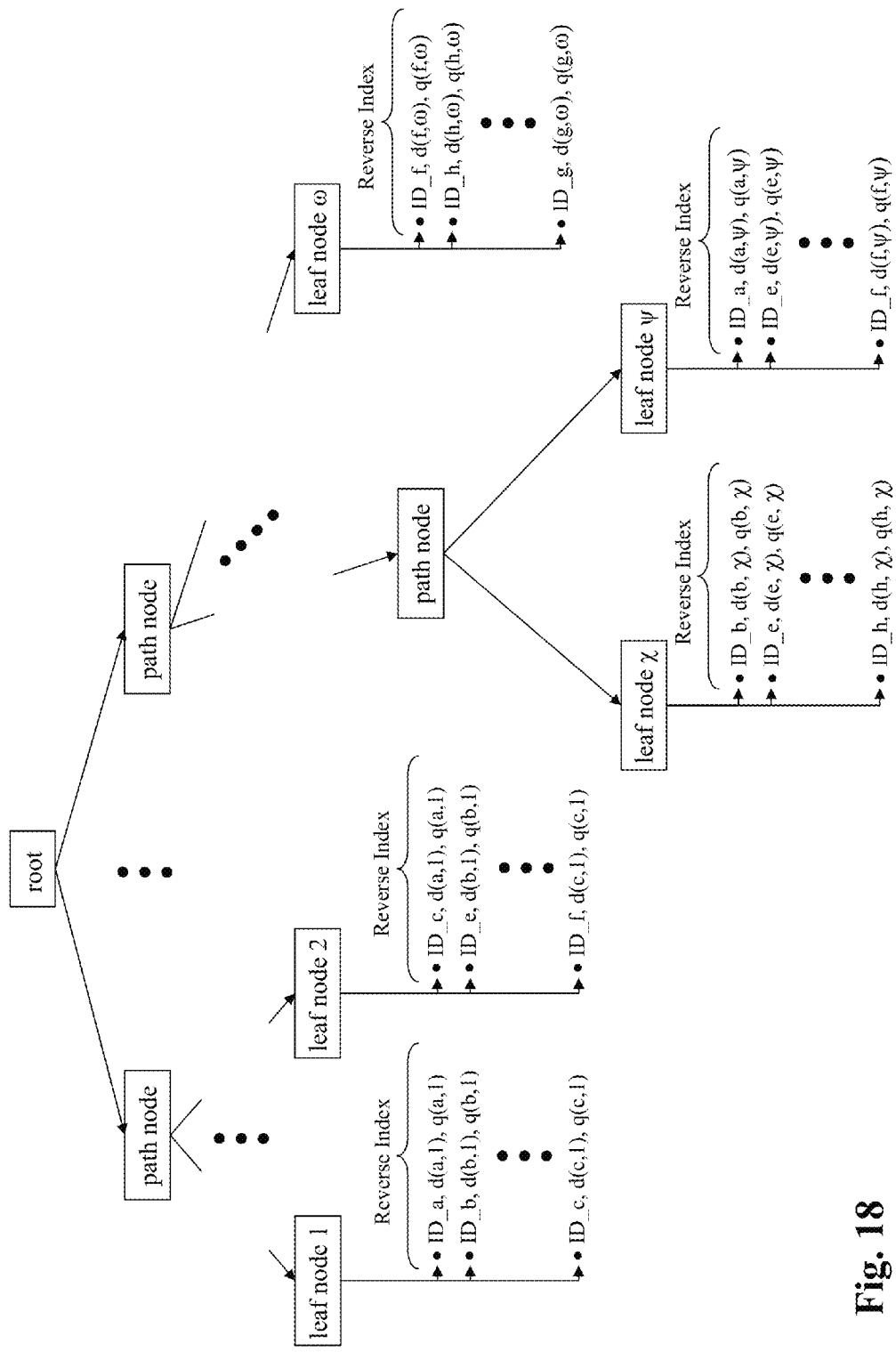
FIG. 18 is a second example of a reverse index tree in accord with the present invention.

For instance, FIG. 18 illustrates a second reverse indexed tree from an unrelated example. A root node is shown at the top, followed by various path nodes along a path from the root node downward to a leaf node. For illustration purposes, only five leaf nodes are shown (i.e. leaf nodes 1, 2, ... X, Ψ, and ω). Additionally, the reverse index (RI) label information of each leaf node is shown in a format consistent with RI_103 of FIG. 16. The present example shows label information for at least registered biometric samples ID's (i.e. registrant's, or object, ID's) ID_a, ID_b, ID_c, ID_e, ID_f, and ID_g, and shows corresponding path vector information "d" and geometric information "q" of each feature point for each leaf node. For example, the reverse index of leaf node 1 is shown to include feature points from at least registration samples ID_a, ID_b, and ID_c.

Returning to FIG. 9A, to identify a pre-registered person, one begins by obtaining a biometric query sample of the person wishing to be identified as being pre-registered, as illustrated by block 44. In the present example, the biometric type in the present example is a finger vein type, and so the biometric query sample provided by block 44 would be a finger vein image, which is typically obtained by an infrared (IR) camera. It is noted, however, that in deployed systems, the IR camera sensor used to obtain this biometric query sample (hereinafter simply termed "query sample") may be smaller than the finger resulting in only a partial finger vein image for querying. Worse still, it is possible that a person may mistakenly place more than one finger on the IR camera sensor so that the biometric query sample actually contains vein patterns from multiple fingers. In incidents when this happens, most often the biometric query sample will have partial views (i.e. partial vein patterns) of two adjacent fingers. This issue of the biometric query sample having vein patterns from more than one finger is addressed later, below. In the immediate discussion, it is assumed that the biometric query sample preferably contains vein patterns from only one finger.

The biometric query sample from block 44 is passed to block 46 to extract query feature points from the query sample. It is preferred that block 46 use a similar technique for feature point extraction as is used in blocks 42A and 42B. Thus, block 46 preferably uses the SIFT transform to identify a query set (or test set) of query item descriptors (or test item descriptors) for the query (or test) sample. As before, the SIFT application identifies item descriptors for each query sample, and each item descriptor preferably includes 128 pieces of descriptive data. Block 47 then sorts (i.e. distributes) the query set of query item descriptors into the reverse index tree created by block 43.

Figure 19:
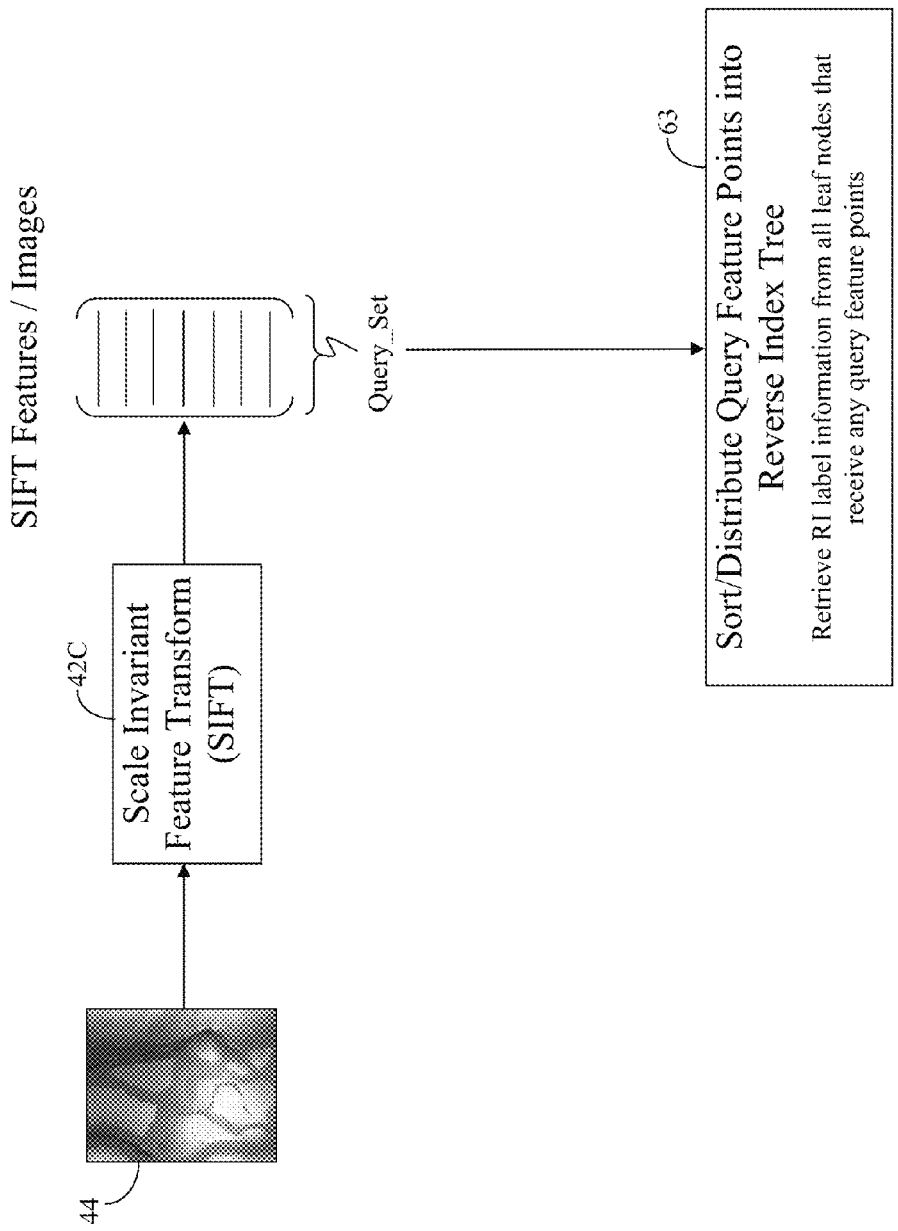
FIG. 19 illustrates the extraction of query SIFT item descriptor from a query image.

A more detailed illustration of this phase of the query operation is provided with reference to FIG. 19. A query sample 44 (i.e. the specific biometric item of the given biometric item class) of a person wishing to be recognized as being pre-registered is received. In deployed systems, the IR camera sensor used to extract the query sample from the person may be different from the IR camera used to originally register the person. As an illustration, query sample 44 is shown to be smaller than, and providing a smaller partial view than, the vein images found in training library 40 of FIG. 10 and registration library 40B of FIG. 15. Block 46 of FIG. 9A extracts query feature points using a feature identification method, such as SIFT block 42C. This produces a query set (i.e. or test set or specific set) of query item descriptors identified as Query Set. As before, each query item descriptor preferably includes 128 pieces of descriptive data (i.e. each is a 128 bit vector). The Query Set is then submitted to block 47 of FIG. 9A, which sorts (i.e. distributes) the query feature points of Query Set into the reverse index tree 51. This is illustrated by block 63 in FIG. 19. Preferably, the query item descriptors are distributed according to descriptive relations established in the creation of the index tree 45. That is, the query set of query item descriptors are preferably distributed using the same data clustering technique used by hierarchical tree construction block 41 of FIG. 9A. As it would be understood, many query feature points will sort into the leaf nodes of the reverse index tree. For ease of discussion, these leaf nodes are termed matching leaf nodes. Block 63 also retrieves the RI label information from the matching leaf nodes, i.e. from all the leaf nodes that receive any query feature point.

Returning to FIG. 9A, the retrieved RI label information from block 47 is used to determine if query sample 44 corresponds to (i.e. matches) a pre-registered person. The preferred technique for making this determination uses a combination of a generative approach and a discriminative approach. Two techniques for achieving this are provided herein. In FIG. 9A, block 49 provides a combined generative and discriminative method/mechanism of authenticating a query image. FIG. 9A provides one implementation of block 49 and FIG. 9B provides a second implementation.

Continuing with FIG. 9A, block 49 receives the retrieved RI label information from block 47. Discriminative tree identification block 52 uses a Discriminative approach to identify candidate matches (i.e. identify possible registered samples, and their corresponding registered persons) that may match the query sample 44. Discriminative tree identification block 52 preferably ignores all geometric information in the RI label information, and instead uses a voting technique based on the ID labels of the registered persons corresponding to the feature points in the matching leaf nodes to identify the candidate matches. These identified label IDs in the matching leaf nodes serve as votes for determining the candidate matches among the registered samples (i.e. registered sample images).

Generative tree identification block 53 uses geometric information of the matched characteristic features identified in the received RI label information. Preferably, it uses rotation, relative location and affine transform to determine a matching score between the query image and the matching characteristic features of the registered images to determine which registered image matches the query image most closely.

The results of the discriminative tree identification block 52 and generative tree identification block 53 may be combined to identify the best overall matching registered image, as illustrated by block 54. If desired, block 54 may also determine if the combined result meets a combined matching threshold needed to authenticated the registered image with the highest combined score as indeed corresponding to the same person that submitted the query image.

Alternatively, the top results from the generative tree identification block 53 may be submitted to the discriminative tree identification block 52 so that the discriminative tree identification block 52 does not need to process all the matching characteristic feature points identified by received RI label information, but only process the feature points of the registered images identified by generative tree identification block 53 as being the most probable matches. Similarly, another alternative implementation is for the discriminative tree identification block 52 process the received RI label information first, and submit its top matching results to the generative tree identification block 53 so that the generative tree identification block 53 does not need to process all the matching characteristic feature points identified by received RI label information, but only process the feature points of the registered images identified by the discriminative tree identification block 52. That is, when the candidate matches identified by the discriminative tree identification block 52 are sent to the generative tree identification block 53, block 53 applies a generative approach to the identified candidate matches, including their geometric information as listed in the retrieved RI label information, to further narrow down the search and determine if a registered match has been found.

The outliers identified by generative and descriminative tree identification block 49 may be discarded. Alternatively, the outliers may be submitted to rejected outlier query feature points block 50 for further process, as explained later below in reference to FIG. 9C.

Returning to FIG. 9A, an exemplary implementation of discriminative tree identification block 52 is as follows.

There are multiple methods of implementing discriminative tree identification block 52 of FIG. 9A. A first method of implementing the discriminative method is to analyze the number and distribution of votes at each leaf node to determine if a registered sample qualifies as a candidate match. A first direct application of the discriminative approach may be to use a threshold of minimum votes (predefined or adjusted based on current vote distribution results) needed to qualify as a candidate match. A second direct application of the discriminative approach is to identify a predefined number of registered samples that receive the most votes as the candidate matches. For example, the three or five registered samples that receive the most votes (i.e. the three or five top vote-getters) may be deemed the candidate matches. Simplified illustrative applications of these two discriminative approaches are provided in FIGS. 20-22.

Figure 20:
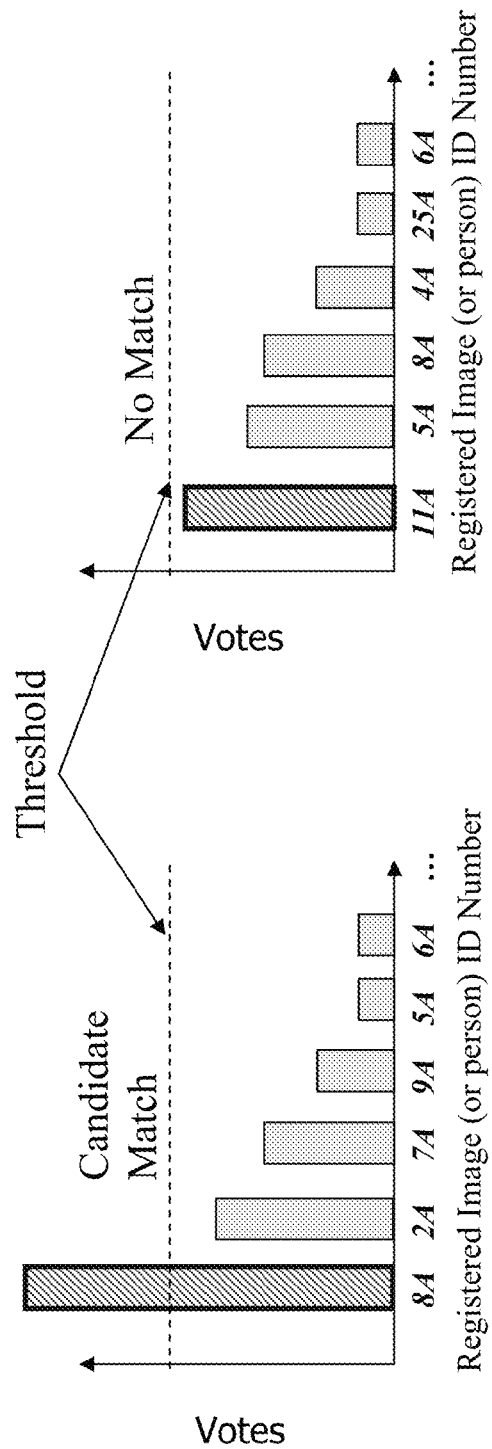
FIGS. 20 to 22 illustrate examples of a discriminative approach to identifying a match between a registered image and a query image.

With reference to FIG. 20, two examples of vote distributions of registered samples with IDs numerically identified as 1A, 2A, 3A, etc. are shown. For illustration purposes, the registered samples are arranged by vote count with the registered samples that receive the more votes shown first. The present example uses a threshold to identify candidate matches. In the histogram sample on the left side of FIG. 20, only registered sample image 8A meets the threshold requirement, and it may be deemed the only candidate match, which would then be passed to generative tree identification block 53 for further verification. Alternatively, a predefined number of images that receive the most votes may be identified as candidate matches. For example, the three registered images that receive the most votes (registered samples 8A, 2A and 7A in the present example) may be deemed the group of candidate matches that are sent to generative tree identification block 53 for further processing. Further alternatively, the threshold may be lowered, and the registered images that meet this lower threshold may be deemed the candidate matches that are sent to block 53. Further alternatively, if no registered image receives the minimum threshold of volts (as illustrated in the histogram sample on the right side of FIG. 20), then the query image may be rejected as not belonging to any registered person without need for further processing from generative tree identification block 53.

Figure 21:
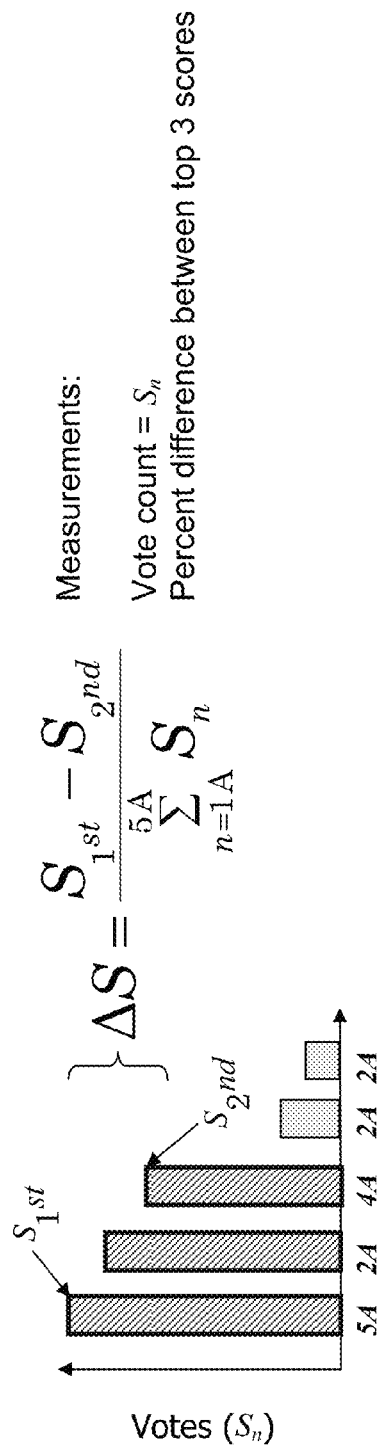
Figure 22:
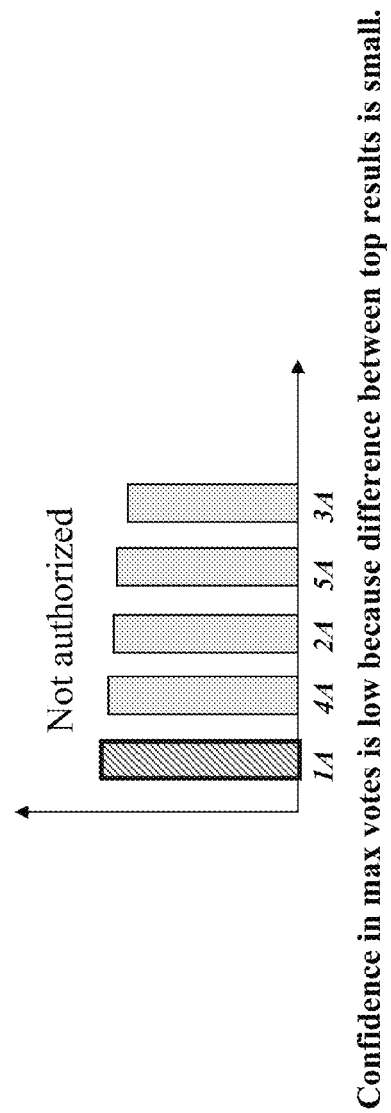

FIGS. 21 and 22 illustrate a second approach where all elements similar to those of FIG. 20 have similar reference characters and are described above. In FIG. 21, the difference (i.e. numeric range in votes) between the top vote-getters among the registered images is identified, and the vote distribution (or their percentage of the total number of votes) may be determined. This approach may accumulate votes and divides votes into ranks based on the maximum number of votes, and the registered images in the top-most rank may be deemed the candidate matches.

As is illustrated in FIG. 21, a percent difference between the top vote-getters (such a range defined by the highest and lowest votes received by the top three or five registered images that received the most votes) may be computed to determine whether that group of registered images constitutes a group of candidate matches. This approach can also be used to compute a confidence score. As long as the computed confidence level is above a predetermined minimum, the registered images within the ranges may be deemed candidate matches. If the confidence is not high enough, then the lowest scoring registered image may be removed from the group and a new confidence calculated until the desired confidence level is achieved. If it is not possible to achieve the desired confidence level even between the top-two vote-getting registered image, such as illustrated in FIG. 22, then the query image may be rejected as not registered without requiring further processing from generative tree identification block 53, or a predefined number of top-getting registered images may be passed to generative tree identification block 53 for further processing. In the case of FIG. 22, the calculated confidence in the registered images that received the most votes is low because the difference between the top vote-getters is small (i.e. below a predefined minimum).

Generative tree identification block 53 uses the SIFT (and/or Affine SIFT) information of the characteristic feature points of the query image and the candidates matches to further compare the query image to the candidates matches. This may optionally include submitting the Query image to a SIFT transform to compare it to all (or some of) the registered images corresponding the persons who are represented by candidate matches. Alternatively, this may involve submitting the query characteristic points a SIFT transform to compare them to the registered characteristic points corresponding to the candidate matches. Irrespective, the generative tree identification block, preferably compares geometric information of the characteristic feature points to find a better match. For example, the relative positions of matching featured points within an image can be compared, and a determination can be made of whether an affine transform can be found that will better align the query characteristic features of the query image to the corresponding characteristic feature points of any of the candidates matches. The closest matching candidate image within the collection of candidate matches may then be selected as corresponding (i.e. being registered to) the same person that submitted the query image.

Figure 23:
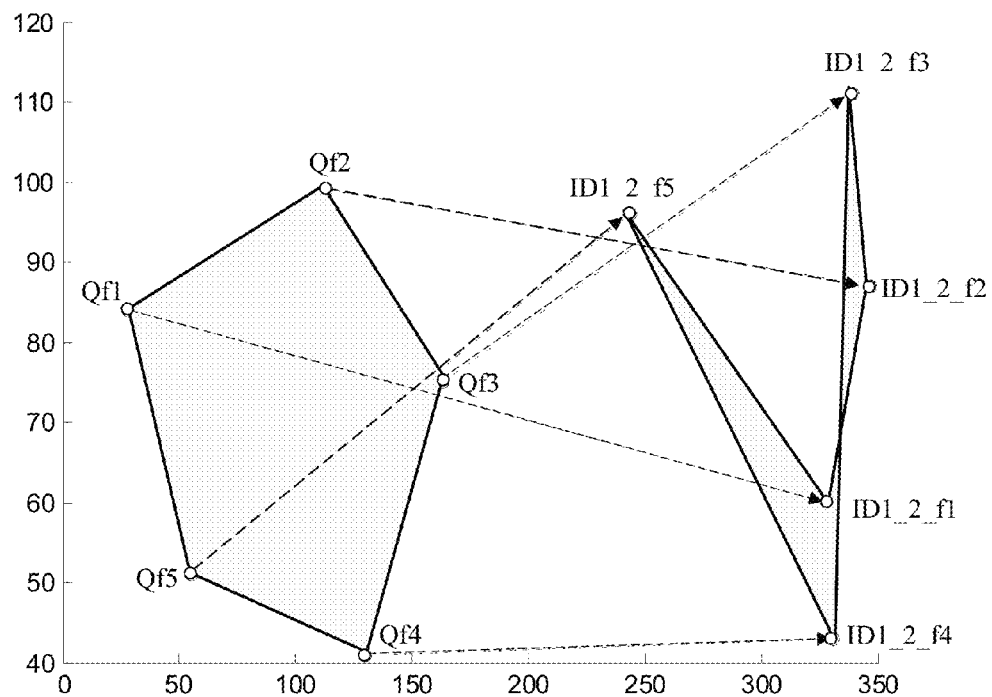
FIGS. 23 and 24 illustrate examples of a generative approach to identifying a match between a registered image and a query image.
Figure 24:
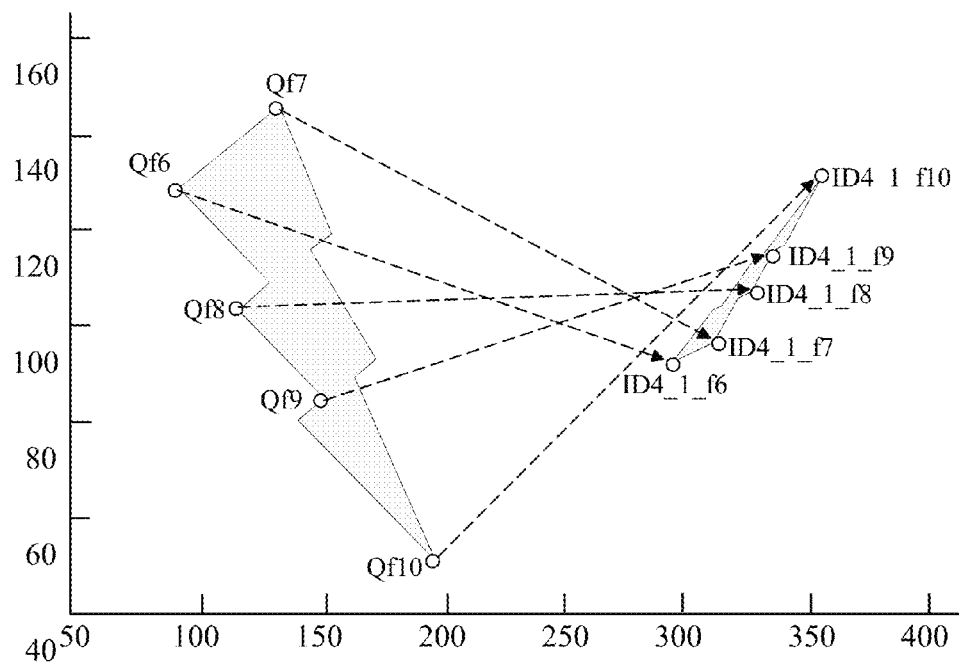

A simplified illustration of this approach is shown in FIGS. 23 and 24. For example in FIG. 23, five query characteristic feature points Qf1 through Qf5 are identified as having been matched to five characteristic feature points of registered image ID1_2. These five registered characteristic feature points are labeled ID1_2_f1 through ID1_2_f5, and they are identified as corresponding to query points Qf1 through Qf5, respectively. As is self-evident form the FIG. 23, the configuration of query characteristic points Qf1 through Qf5 does not match well the configuration of registered characteristic feature points ID1_2_f1 through ID1_2_f5 of registered image ID1_2, and no rotation, resizing, or affine transform can line them up properly. If desired, the general directional momentum of the individual characteristic features may also be compared. As a second example in FIG. 24, five more query characteristic feature points Qf6 through Qf10 are identified as corresponding to (i.e. matching) five registered characteristic points ID4_1_f6 through ID4_1_f10, respectively, of registered image ID4_1. As shown, a resizing, rotating, and affine transformation results in the configuration of query characteristic points Qf6 through Qf10 better matching the configuration of registered characteristic points ID4_1_f6 through ID4_1_f10. Thus in the examples of FIGS. 23 and 24, it can be determined that the query sample better matches registered image ID4_2 (which corresponds to the registered person whose identification code is ID4) than registered image ID1_2. Consequently, the query sample may be deemed to match the registered person whose identification code corresponds to ID4, and reject as a possible match the registered person whose ID corresponds to ID1.

A more detailed discussion of a first method of implementing generative and discriminative tree identification block 49 of FIG. 9A is as follows.

As is explained above, reverse index hierarchical tree 51 (which may be considered a type of vocabulary tree for discussion purposes), is built in two steps. The first step is a construction step in which hierarchical tree 45 is built using the training images and any one of a multiple known tree construction techniques, such as K-Mean, K-D, etc. The second step is a registration step in which reverse index hierarchical tree 51 is built by distributing registration images into the hierarchical tree and defining reverse index (RI) information (which may simply be termed "RI" herein for discussion purposes) for each leaf node. The RI information records all registration IDs with at least one descriptor of the registration images (i.e., registration feature descriptor, or registration feature point) that reaches a leaf node.

During the query process, each query descriptor from the query image traverse (i.e. are sorted into) the tree at each level and reaches its closest leaf node. Assuming that the number of leaf nodes is N, and that X defines the set of query descriptors extracted from query image, then the voting process for object l (i.e. the ID, or label, of the registered person, image, object) factorizes the posterior $P_O(l|X)$ into a per-leaf node estimation, i.e.

$$P_o(l|X) = \sum_i^N P(l|n_i, X)P(n_i|X) \quad (1)$$

where $n_i$ represent the $i^{th}$ leaf node. $P_O(l|X)$ denotes the probability to observe node $n_i$ given X, and $$P_o(n_i|X) = \begin{cases} 1 & X \text{ has descriptor that reaches } n_i \\ 0 & \text{otherwise,} \end{cases}$$

$P(l|n_i, X)$ is the vote obtained from leaf node $n_i$. To determine the votes at each leaf node, one may simply set $P(l|n_i, X) = N_i/(\Sigma_j N_j)$ where $N_i$ is the number of query descriptors that reaches leaf node $n_i$.

A presently preferred method of determining votes (or score) for each leaf node, however, is to use a weighing method based a Term Frequency—Inverse Document Frequency (TF-IDF) technique. A discussion of a TF-IDF weighing technique is found in "Scalable Recognition With a Vocabulary Tree", Proc. of CVPR'06, 2006, by Nister et al., which is herein incorporated by reference in its entirety. In the presently preferred TF-IDF technique, each tree node is given an ID-independent weight $w_1$ calculated by $$w_j = \ln \frac{I}{I_j} \quad (2)$$

where I is the number of training images, and $I_j$ is the number of training images with at least one training descriptor that passes through node j.

Using this approach, each training image with label l can define a "path vector" $d_{li}$ at leaf node $n_i$. The dimension of each path vector $d_{li}$ would equal to the depth of leaf node $n_i$ in the tree. Each dimension $d_j$ of path vector $d_{li}$ would be equal to $w_j N_j$. As is explained above, the path vector is preferably stored in the RI information of leaf node $n_i$. Similarly, the query image may also define a path vector v, so that the vote score at teach leaf node may be defined as $$P(l|n_i, X) = \begin{cases} \left\| \frac{v}{\|v\|} - \frac{d_{li}}{\|d_{li}\|} \right\| & l \text{ is in the } RI \text{ of } n_i \\ 0 & \text{otherwise,} \end{cases} \quad (3)$$

Keeping the above notation in mind, a preferred implementation of generative tree identification block 53 is as follows. Block 53 models the geometrical layout of feature points. The alignment error based on the optimal transformation $f(\cdot)$, between the query image and database of registered images can be used to derive a confidence score for recognition. The type of transform is pre-assumed (i.e. pre-defined) to constrain the freedom of transformation $f(\cdot)$, such as rigid or affine transform. That is, by limiting the possible types of permissible transformations when looking for the optimal transformation that best aligns the query image to one or more registered images (i.e. best aligns their respective feature points) one may establish constraints that aid in the fitting (i.e. alignment) operation. An alignment score for the geometric approach (i.e. when using reverse index tree 51 as a generative tree), may be defined as:

$$P_o(l|X) = P(X|l)P_r(l)/P(X) \quad (4)$$
$$= \frac{P(X|l)P_r(l)}{\sum_m P(X|m)P_r(m)}$$

where $P_r(l)$ is the prior of label l, and $P_r(X|l)$ is based on the alignment error, such as a Gaussian:

$$P_o(X|l) = \exp\left(\frac{-\|f(P) - Q_l\|_F^2}{\sigma}\right) \quad (5)$$

where P is the locations of query descriptors X, and $Q_l$ is the set of corresponding matched target (registration) descriptors for object l. Equation (5) would be fitted to equation (4) to find the best transformation $f(\cdot)$ and alignment score.

Typically, a key challenge in considering geometrical layout for recognition is how to efficiently identify matching pairs of descriptors between query image and database of registered images. In the presently preferred embodiment, however, reverse index tree 51 is used to identify these matching pairs. That is, discriminative tree identification block 52 and discriminative tree identification block 52 both use the same reverse index tree 51 to obtained their candidate matching pairs of descriptors (feature points). To elaborate, during the registration process/step/mechanism discussed above, in addition to registering the ID and path vector of each registration image into a leaf node's RI information, geometric information of each registration descriptor (i.e. registration feature point), such as its spatial location is also registered into a leaf node's RI information. In the query process/step/mechanism, after a query descriptor x at location p finds the best leaf node, the set of locations $Q=(q_1, \ldots, q_l, \ldots, q_M)$ for the corresponding registration image (or object) ID $(1, \ldots, l, \ldots, M)$ can be obtained from the leaf node's RI information. Each $q_l$ becomes a candidate matching target of p in object l. In this way, one can efficiently get the set of matching candidate descriptors from the database of registration image (objects) l at no additional searching cost.

With reference to FIG. 9B, where all elements similar to those of FIG. 9A have similar reference characters and are described above, a preferred embodiment of the represent invention combines the functions of generative tree identification block 53 and discriminative tree identification block 52 of FIG. 9A within block 49 into a single combined generative and discriminative tree identification block 55.

One may achieve this goal by simply fusing the two functions of blocks 52 and 53 of FIG. 9A and using the same reverse index tree 51, but a preferred method based on Bayesian theory is herein describe. In the generative approach, a leaf node might not contribute to calculating the generative probability. For example in equation, i.e. Eq., (1) described above, where the hidden leaf node layer is considered, it only provides a binary score for $P(n_i|X)$, and does not contribute to the generative probability. It is herein proposed that that $P(n_i|X)$ can be used to evaluate the reliability of a vote from leaf node $n_i$ by decomposing the image wise alignment error into the summation of per-leaf node alignment error. First, one defines $$P_r(n_i \mid l) = \begin{cases} 1 & l \text{ is in the } RI \text{ information of } n_i \\ 0 & \text{otherwise} \end{cases} \quad (6)$$

Revisiting Eq. (1), assume the prior distribution of each leaf node $P_r(n_i)$ is uniform, then $$P(n_i \mid X) = \sum_m \frac{P(X \mid m, n_i) P_r(m \mid n_i)}{\sum_j^N P(X \mid m, n_j) P_r(m \mid n_j)} \quad (7)$$

Incorporating Eq. (6) and Eq. (7) into Eq. (1), one obtains:

$$\begin{aligned} P_o(l \mid X) &= \sum_i^N P(l \mid n_i, X) \sum_m \frac{P(X \mid m, n_i) P_r(m \mid n_i)}{\sum_j^N P(X \mid m, n_j) P_r(m \mid n_j)} \\ &= \sum_i^N P(l \mid n_i, X) \frac{P(X \mid l, n_i) P_r(n_i \mid l)}{\sum_j^N P(X \mid l, n_j) P_r(n_j \mid l)} \\ &= \sum_i^N P(l \mid n_i, X) \frac{P(X \mid l, n_i)}{P(X \mid l)} \end{aligned} \quad (8)$$

where $P(X \mid l, n_i)$ is the generative probability to observe X using the descriptors of object l registered at leaf node $n_i$. The second term in Eq. (8) represents the portion of alignment error at leaf node $n_i$.

Since $P(l \mid n_i, X)$ is the discriminative vote from Eq. (3) and $P(n_i \mid X)$ is the generative alignment error contributed by leaf node $n_i$, Eq. (8) is both discriminative and generative. The underlying intuition in Eq. (8) is that, the first term applies the TF-IDF scheme to obtain a vote from leaf node $n_i$, while the second term provides a confidence for the vote.

A more detailed implementation of this combined generative and discriminative approach is as follows. As is explained above, the basic idea is that besides using the votes from individual SIFT descriptors, their geometrical relation is also considered. The correct match should result from one dominant affine transform. An overview of its implementation follows the follow flow: (a) build a (vocabulary) tree; (b) during registration, for each SIFT descriptor, its x/y location and orientation are recorded at the leaf node the descriptor reaches; (c) during query, the sets of SIFT descriptors from multiple registration (or training) images are found as candidates; (d) the geometry-constrained matching score is then calculated for each candidate; and (e) the top matching score will be used for recognition and authorization.

The following example defines the matching pairs of descriptors, P and Q, as $$P = \left\{ \begin{bmatrix} p_x^1 \\ p_y^1 \end{bmatrix}, \begin{bmatrix} p_x^2 \\ p_y^2 \end{bmatrix}, \ldots, \begin{bmatrix} p_x^N \\ p_y^N \end{bmatrix} \right\}$$

$$Q = \left\{ \begin{bmatrix} q_x^1 \\ q_y^1 \end{bmatrix}, \begin{bmatrix} q_x^2 \\ q_y^2 \end{bmatrix}, \ldots, \begin{bmatrix} q_x^N \\ q_y^N \end{bmatrix} \right\}$$

Applying this notation to Eq. (5), above, one defines the origin $C_0^*$ of rotation and a 2×2 linear transform $W^*$ from P to Q, as $$W^*, C_0^* = \arg\min_W \|W(P - C_0) - (Q - C_0)\|_F^2 \text{ st. } \Phi(W)$$

One then calculates the similarity between $W^*(P - C_0^*)$ and $(Q - C_0^*)$. Here, $\Phi(W)$ defines a constraint.

Preferably, the constraints include:

i. Affine transform, allows rotation, reflection, shift and scale transform. W is an arbitrary 2×2 matrix. Optionally, an open source computer vision (OpenCV) solver may be used.

ii. No scale transform, i.e., W must be orthogonal, hence $WW^T = I$ iii. No reflection, hence $WW^T = I$ and $W_{11} = W_{22}$ Using these constraints, one may fit Eq. (5) into Eq. (4) in an iterative process through proper problem formation. Preferably this includes a robust estimation algorithm define as:

1. Init $e_{min} = \inf$
2. In each of M iterations,
   a. Sample n points $P_m$ and $Q_m$
   b. Solve the fitting problem, which may be defined as:

$$W_m^*, C_{m0}^* = \arg\min_W \|W(P_m - C_0) - (Q_m - C_0)\|_F^2 \text{ st. } WW^T = I$$

c. Calculate the matching errors of all n points. Then find the median $e_m$
   d. If $e_m < e_{min}$, record $W_m^* = W$, $C_0^* = C_{m0}^*$, and update $e_{min} = e_m$.
3. Final matching score $$s = \sum_{i=1}^N \exp\left(-\alpha \|W^*(p^i - C_0^*) - (q^i - C_0^*)\|^2\right)$$

An integral part of the presently preferred approach is to combine multiple scores. Two matching strategies are presently contemplated; one is synthesized from existing descriptor and the other is used together with existing descriptor to vote for different finger ID.

Theoretically, the tree voting is a discriminative approach that factorizes the posterior $P_{dis}(l \mid X)$ (wherein "dis" denote its discriminative function) into the contribution from each tree node. This is formulated in Eq. (1), above, which is herein repeated for convenience.

$$P_{dis}(l \mid X) = \sum_i P(l \mid n_i, X) P(n_i \mid X)$$

$$P(n_i \mid X) = \frac{N_i}{N}$$

$$P(l \mid n_i) = \begin{cases} 1 & \text{if } l \text{ is in the reverse list of node } i \\ 0 & \text{otherwise} \end{cases}$$

By contrast, the generative approach uses geometrical matching, and preferably uses constrained geometrical matching. The geometrical relation between query and database image descriptors are considered to generate the matching score. This is defined in Eq. (4) above, which is here simplified for convenience (wherein "gen" denotes its generative function).

$$P_{gen}(l \mid X) = P(X \mid l) P(l) / P(X) \propto P(X \mid l)$$

The likelihood can be calculated from the geometrical alignment error, as defined by Eq. (5) and rewritten here as:

$$P(X \mid l) = \sum_{j=1}^{N_l} \exp(-\alpha \|W^*(x_j - C_0^*) - (1_j - C_0^*)\|^2)$$

where $W^*$ and $C_0^*$ represents a best constrained affine transform, $x_j$ and $l_j$ is one matched descriptor pair found by the tree, and $N_l$ is the total number of descriptor pairs.

The estimation is then made more robust by means of classifier fusion, as follows:

$$\mathrm{conf}(l|X) = P_{dis}(l|X) + \lambda P_{gen}(l|X)$$

The combine discriminative and generative approach thus results in Eq. (8). This can be seen by noting that:

$$\text{Since } P_{dis}(l \mid X) = \sum_i P(l \mid n_i, X) P(n_i \mid X)$$

$$\text{and } P(l \mid n_i, X) = P_{gen}(X \mid l, n_i) P(l \mid n_i) P(n_i \mid X) / P(X)$$

$$P_{dis}(l \mid X) = \sum_i P_{gen}(X \mid l, n_i) P(l \mid n_i) P(n_i \mid X) / P(X)$$

$$\alpha \sum_i P_{gen}(X \mid l, n_i) P(l \mid n_i) P(n_i \mid X) / P(X)$$

Here, $P_{gen}(X|l, n_i)$ denotes the per-leaf likelihood calculated by $$P_{gen}(X \mid l, n_i) = \sum_{j=1}^{N_{il}} \exp(-\alpha \|W^*(x_{ij} - C_0^*) - (1_{ij} - C_0^*)\|^2)$$

The above combine generative and discriminative approach was tested by applying it to a finger vein recognition application in a typical recognition setting. In the present test, the dataset contained 232 finger IDs from 116 subjects, each with 10 vein images collected by a 280 mm×400 mm CCD image sensor. The experiments was performed with 1~5 out of the 10 images for training, and the rest for testing. A monotonic decrease of ERR was observed as the number of training samples increased. The ERR scores for the proposed tree model were 1.3%, 0.26%, 0.17%, 0.07% and 0.05% respectively. According to Table 1 in FIG. 25, with 4 or more example vein images per finger ID, the present method outperforms all benchmark results.

A second experiment tested vein recognition in more a practical setting by using a more cost-effective CCD sensor during the recognition process. The training set contained 42 finger IDs with vein images collected by the same 280 mm×400 mm CCD image sensor. The testing set was collected using a smaller 200 mm×200 mm sensor. The subject changed their finger location so that the center of the smaller sensor corresponded to 9 different sub-regions of the larger sensor, from top-left (1) to bottom-right (9).

Figure 26:
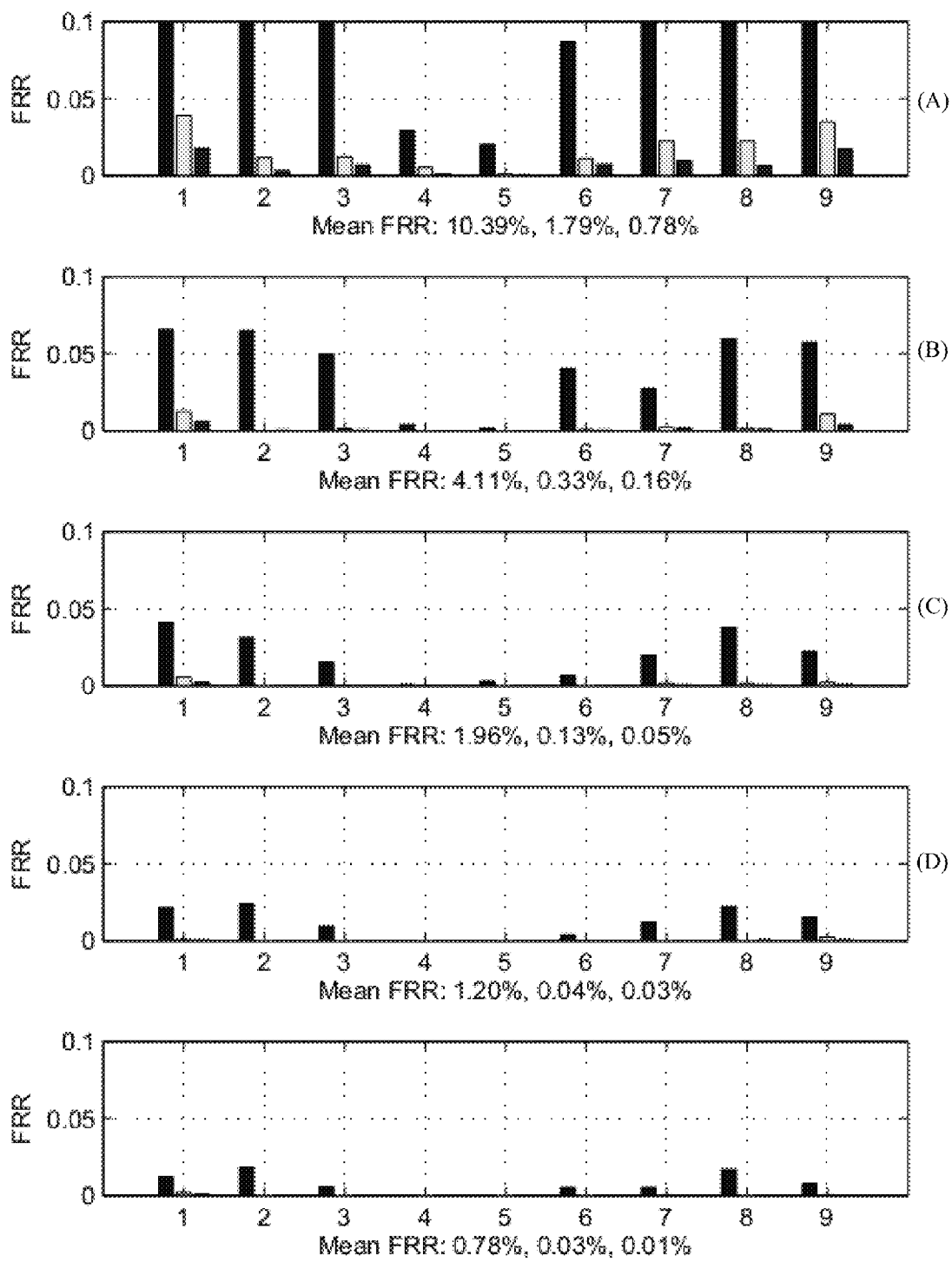
FIG. 26 illustrates charts highlighting results obtained with the present invention.

Chart (A) through Chart (D) in FIG. 26 show a comparison between purely discriminative, purely generative and the presently proposed combined discriminative-and-generative approach. For each chart, the mean False Rejection Rate (FFR) results at zero false alarms are shown, with the first value corresponding to the purely discriminative approach, the second value corresponding to the purely generative, and the third value corresponding to the present combined discriminative-and-generative approach. As shown, the performance of the purely discriminative approach is comparable to the performance of the purely generative approach. However, the presently proposed combined discriminative-and-generative tree model consistently achieved the best performance.

Figure 27:
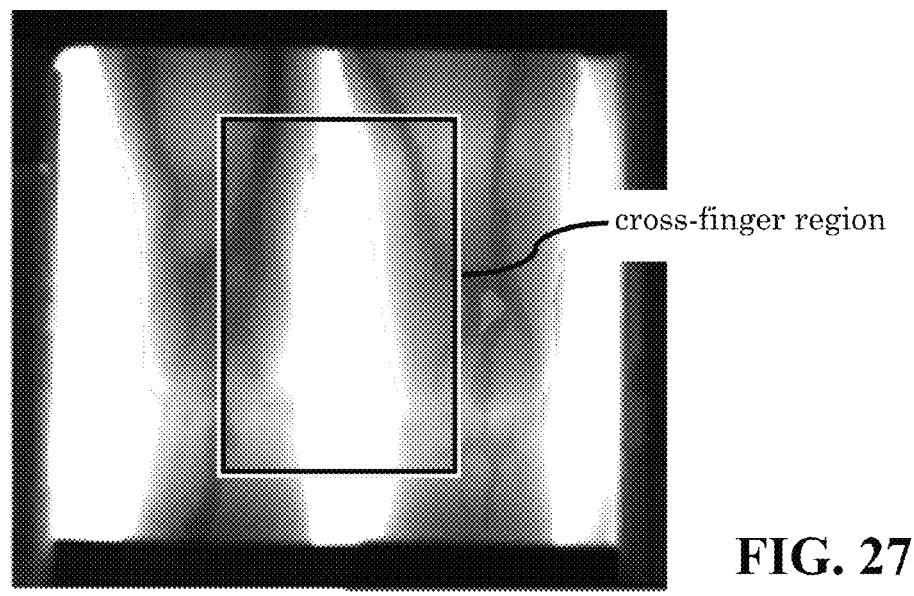
FIG. 27 illustrates a cross-finger region.

The above embodiments of FIGS. 9A and 9B work well for one-to-one matching operations. That is, they attempt to match the query imaged to a registered image by identifying a single optimized SIFT transform. A difficulty arises when there is no one-to-one match due to a problem in the acquisition of the query image. For example, the query vein image may include a cross-finger region, i.e. the query images may cross (or span) more than one finger, as is illustrated in FIG. 27. This would mean that the query image would include multiple partial matching vein patterns from more than one finger. Since this query image would include more than one finger image, there is no one-to-one match with the database of registered images.

To address this problem, it is herein proposed to solve multiple affine transforms for achieve a one-to-many matching operation, while applying practical constraints with robust estimation.

As is illustrated in FIG. 27, a typical cross-finger region would include two fingers, but other circumstances where more than two fingers (query objects) in the query image are also contemplated in this embodiment. Thus, the preferred embodiment should be able to observe, i.e. to recognize or match, two or more matching patterns.

Figure 28:
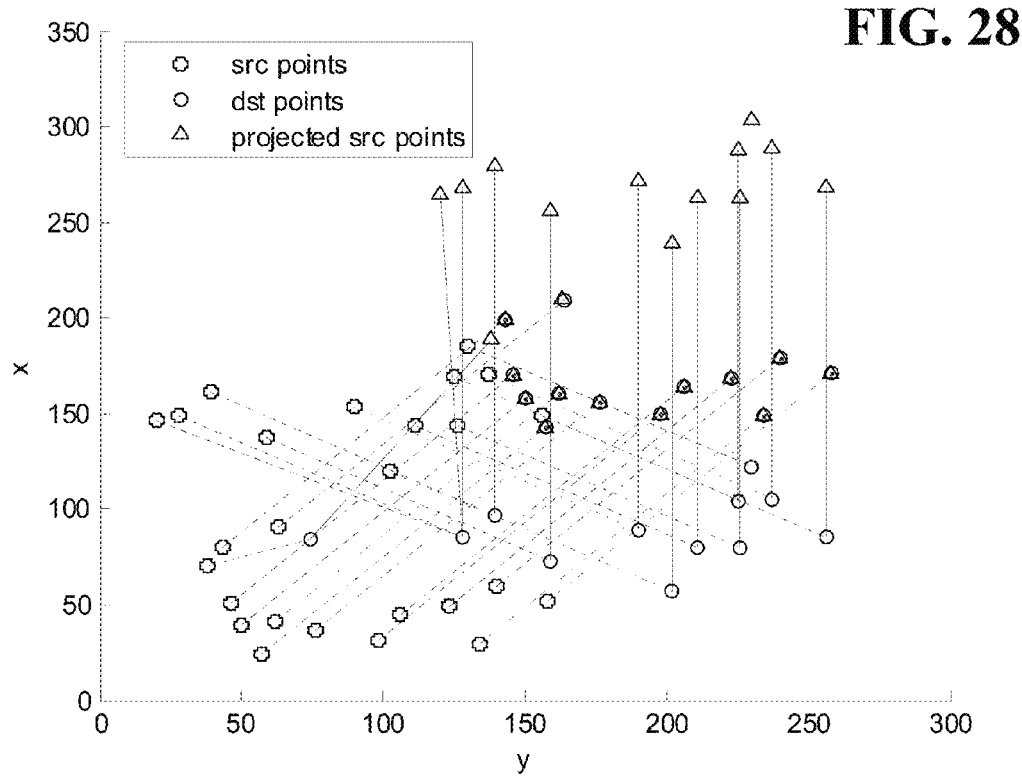
FIG. 28 illustrates the matching of one set of query item descriptors to two separate sets of registration item descriptors.

An example of a single set of query descriptors matching two patterns of registered descriptors is illustrated in FIG. 28. The two patterns are matched by applying a first SIFT transform to a first subset of query descriptors within a single set of query descriptors, and applying a second SIFT transform to a second subset within the same single set of query descriptors.

To facilitate the search for the multiple transforms, some constraints may be defined from prior knowledge of the objects being sought. For example, in the case of finger vein patterns, it may be assumed that the fingers in the cross-finger region are from the same hand. If it is further assumed that the two, or more, fingers in the cross-finger region are in parallel, then in can be inferred that the two (or more) patterns share the same rotation transform, but have different shift transforms.

Since the above described embodiments of FIGS. 9A and 9B only search for one combined transform, i.e. one rotation and one shift transform, if the query image had more than one pattern, then all but one of the patterns would be regarded as outliers, as illustrated by block 50 in FIGS. 9A and 9B. By contrast, the present embodiment finds two, or more, transforms instead of just one. In one implementation of the present embodiment, the second (or more) transform is sought among the outliers (within block 50) identified during the search for the first matching pattern.

A simplified overview of these approach is illustrated in FIG. 9C, where elements similar to those of FIGS. 9A and 9B have similar reference characters and are described above. Like before, generative and discriminative tree identification block 49 receives the RI information of the leaf nodes that received any query descriptor from the query image 44, identifies a matching registered image, and rejects the outlier query descriptors, as illustrated by block 50. In the present illustration, it is assumed that generative and discriminative tree identification block 49 also determines a final confidence score for identified matching registered image, as is done by block 49 in FIG. 9B and by bocks 49 and 54 in FIG. 9C.

If it is desired that the present embodiment search for a second matching pattern, then the query descriptors identified as outliers by block 49 are submitted to another generative and discriminative tree identification block 49B (or to the same generative and discriminative tree identification block 49 for a second iteration) to try to match the outlier query descriptors to a registered image. The second iteration identifies its matching registered image and assigns it a confidence score. The results from the two generative and discriminative tree identification block 49 and 49B (or from the two repeated applications of generative and discriminative tree identification block 49) are submitted to block 56, which compare the results. If both results agree on the same person (as determined by the ID, or label), this would boost the confidence that an accurate match has been found. If the two results differ, however, one may then compare both confidence levels to make a selection and assign a new confidence level to the higher scoring match (which may be lower than its initial score). If desired, block 56 may compare the new confidence score of the identified match with a first threshold TH1. If the confidence level is found to be high (i.e. greater than TH1), then the matching ID may be deemed to have been authenticated, as illustrated by block 57. If the score is lower than TH1, then the match may be rejected and the query person flagged as not being authenticated (as illustrated by block 49), or the outliers identified by block 49B (or these second application of block 49) may be submitted to a third generative and discriminative tree identification block 49C (to a third application of block 49). Block 56 may further determine that if both blocks 49 and 49B agree on the matched ID, then the combined confidence score is boosted above TH1.

The third generative and discriminative tree identification block 49C (or the third application of block 49) then attempts to find a new match for the outliers from block 49B, and assign a confidence level to its identified match. Block 56 may then combine the results of block 49C with those of block 49 and 49B and compare the combined score with TH1. Alternatively, the block 58 may combine the results of block 49C with those of block 49 and 49B and compare the combined score with a second threshold TH2 (different from TH1). The combined score may take into account with any of the three identified matches agree with each other. Any two identified possible matches agree, the confidence score assigned to that match may be increased. Similar, if all three possible matches agree, then the confidence level of that match is greatly increased.

Following this pattern, the number of (or repeated applications of) the generative and discriminative tree identification block may be made to match the number of separate patterns that one wishes to identify. Thus, if a system requires matching the finger vein patterns of four fingers, then four applications of the generative and discriminative tree identification block would be needed. In still another embodiment, the second and subsequent applications of the generative and discriminative tree identification block may be limited to its generative application and thus limit itself to identifying an suitable SIFT transform while omitting the voting operation of the discriminative application.

Another preferred implementation of the present embodiment is as follows. The problem is first formulated as:

$$\{W^*, C_0^*\}_{i=1,\ldots,K} = \operatorname{argmin}_{W,C} \sum_i \left\| W_i(\hat{P}_i - C_{i0}) - (\hat{Q}_i - C_{i0}) \right\|_F^2$$

st. $\Phi(W_i)$, $\hat{P}_i$ and $\hat{Q}_i$ are inliers of the $i^{th}$ transform The multi-mode robust estimation may then be defined by the following steps:
1. Set the outlier flags of all data to false
2. Run single-mode robust estimation to obtain the first transform, and $W_1^*$ and $C_{10}^*$
3. At each of $i=2, \ldots, K-1$ iterations,
    a) Select the points subset $\check{P}$ and $\check{Q}$ whose outlier flag are true;
4. Run single-mode estimation to find $W_i^*$ and $C_{i0}^*$
    a) Update the outlier flag of $\check{P}$ and $\check{Q}$, where the points matched with $W_i^*$ and $C_{i0}^*$ are now labeled as inliers.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of searching for a query object within an object class, said method comprising:
   (a) accessing a collection of unique training samples of multiple training objects within said object class;
   (b) defining a separate training set of training item descriptors from each of said training samples;
   (c) creating a composite collection of training item descriptors from the separate training sets of sample item descriptors;
   (d) creating a hierarchical tree from said composite collection of training item descriptors according to relations in the training item descriptors, said hierarchical tree having a plurality of leaf nodes;
   (e) accessing registration sets of registration item descriptors defined from respective registration samples obtained from registration objects of said object class, distributing said registration sets of registration item descriptors into said hierarchical tree according to said relations defined in the creation of said hierarchical tree, indexing the registration item descriptors clustered within each leaf node to their corresponding registration samples, said indexing including defining reverse index (RI) information at each leaf node specifying for each registration item descriptor within the leaf node, an ID label identifying its corresponding registration sample from which it was defined and geometric information obtained as part of its definition;
   (f) accessing a query sample from said query object, defining a query set of query item descriptors from said query sample, distributing said query set of query item descriptors into said hierarchical tree according to said relations defined in the creation of said hierarchical tree, each query item descriptor that reaches a leaf node defining a separate potential descriptor-match pair with each individual registration item descriptor that is within the same reached leaf node;
   (g) submitting the RI information of each leaf node reached by a query item descriptor to a first generative-and-descriminative identification process, wherein:
      (i) said generative-and-descriminative identification process applies a descriminative matching model to the potential descriptor-match pairs using the ID label information provided by the RI information, the descriminative matching model identifying a first discriminatively-matched registration object with a first descirmiantive confidence;
      (ii) said generative-and-descriminative identification process applies a generative matching model to the potential descriptor-match pairs using the geometric information within the RI information, said generative matching model identifying a transform that best matches the query item descriptors to a their paired registration item descriptors, and identifying as a first generative-matched registration object with a first generative confidence the registration object best represented by the registration item descriptors matched to the query item descriptors by the identified transform; and (iii) combining the first descirmiantive confidence and the first generative confidence to determine a registration object that matches the query object.

2. The method of claim 1, wherein in (i), the applying of said descriminative matching model to the potential descriptor-match pairs omits use of any geometric information within the RI information.

3. The method of claim 1, wherein in (ii), the identified transform is a SIFT transform.

4. The method of claim 1, wherein in (ii), the identified transform is an Affine SIFT transform.

5. The method of claim 1, wherein in (g) the geometric information obtained as part of its definition include the relative position and orientation of the registration item descriptor within its respective registration sample.

6. The method of claim 1, wherein in (ii), the generative matching model is defined as:

$$P_o(l\mid X) = \frac{P(X\mid l)P_r(l)}{\sum_m P(X\mid m)P_r(m)}$$

where X defines the set of query item descriptors extracted from query sample, $P_r(l)$ is the prior of ID label l, and $P_r(X|l)$ is based on the alignment error.

7. The method of claim 6, wherein the alignment error is a Gaussian defined as:

$$P_o(X\mid l) = \exp\left(\frac{-\|f(P) - Q_l\|_F^2}{\sigma}\right)$$

where P is the locations of query item descriptors X, and $Q_l$ is the set of corresponding paired registration item descriptors for object l.

8. The method of claim 1, wherein in (i), the descriminative matching model uses a voting scheme based on the number of ID labels represented at each leaf node reached by a query item descriptor.

9. The method of claim 1, wherein:
in (e), the RI information of each leaf node includes a registration path vector of each registration item descriptor through the hierarchical tree on its way to reaching a leaf node;
in (f), a query path vector is defined for each query item descriptor that reaches a leaf node, the query path vector being a path vector of each query item descriptor through the hierarchical tree on its way to reaching a leaf node; and
in (i), descriminative matching model compares the query path vectors and registration path vectors of the potential descriptor-match pairs in its identifying of the first discriminatively-matched registration object with a first descirmiantive confidence.

10. The method of claim 1, wherein the number of leaf nodes is N, and X defines the set of query item descriptors extracted from query sample, and the descriminative matching model uses a voting process for registered object l that factorizes a posterior $P_O(l|X)$ into a per-leaf node estimation defined as:

$$P_o(l\mid X) = \sum_i^N P(l\mid n_i, X)P(n_i\mid X)$$

where $n_i$ represent the $i^{th}$ leaf node $P_O(l|X)$ denotes the probability to observe node $n_i$ given X, and $$P_o(n_i\mid X) = \begin{cases} 1 & X \text{ has descriptor that reaches } n_i, \\ 0 & \text{otherwise} \end{cases}$$

$P(l|n_i,X)$ is the vote obtained from leaf node $n_i$.

11. The method of claim 10, wherein the descriminative matching model uses a Term Frequency—Inverse Document Frequency (TF-IDF) technique where each tree node is given an ID-independent weight $w_j$ defined as $$w_j = \ln\frac{I}{I_j}$$

where I is the number of training samples, and $I_j$ is the number of training samples with at least one training item descriptor that passes through node j.

12. The method of claim 11, wherein each registration sample with ID label l defines a "path vector" $d_{li}$ at leaf node $n_i$, the dimension of each path vector $d_{li}$ equals to the depth of leaf node $n_i$ in the hierarchical tree, each dimension $d_j$ of path vector $d_{li}$ is equal to $w_j N_j$ the path vector is stored in the RI information of leaf each leaf node $n_i$, the query sample defines a path vector v, and the descriminative matching model defines said first descirmiantive confidence as:

$$P(l\mid n_i, X) = \begin{cases} \left\|\frac{v}{\|v\|} - \frac{d_{li}}{\|d_{li}\|}\right\| & l \text{ is in the } RI \text{ of } n_i. \\ 0 & \text{otherwise} \end{cases}$$

13. The method of claim 1, wherein (iii), the combined first descirmiantive confidence and the first generative confidence to determine a registration object that matches the query object is defined as $$P_o(l\mid X) = \sum_i^N P(l\mid n_i, X)\frac{P(X\mid l, n_i)}{P(X\mid l)}$$

where N is the number of leaf nodes, X defines the set of query item descriptors extracted from query sample, l is the registered object ID label, where $n_i$ represent the $i^{th}$ leaf node $P_O(l|X)$ denotes the probability to observe node $n_i$ given X, $P(X|l,n_i)$ is the generative probability to observe X using the registration item descriptors of registration object l registered at leaf node $n_i$, and second term in represents the portion of an alignment error between the query item descriptors and registration item descriptors at leaf node $n_i$.

14. The method of claim 1, wherein the query items descriptors that that are not matched to the first discriminatively-matched registration object or to the first generative-matched registration object are re-submitted to a second generative-and-descriminative identification process to identify a second descriminatively-matched registration object and second generative-matched registration object, and the results of the first and second generative-and-descriminative identification processes are compared to determined if a registration object may be matched to the query object.

15. The method of claim 14, wherein the query object is authenticated if the first and second generative-and-descriminative identification processes agree on the matched registration object.

16. The method of claim 14, wherein the query items descriptors that that are not matched to the second descriminatively-matched registration object or to the second generative-matched registration object are re-submitted to a third generative-and-descriminative identification process to identify a third descriminatively-matched registration object and a third generative-matched registration object, and the results of the first, second, and third generative-and-descriminative identification processes are compared to determined if a registered object is matched to the query object.

17. The method of claim 1, wherein in (iii), the first descirmiantive confidence and the first generative confidence are combined using a technique based on Bayesian inference theory.

18. The method of claim 1, wherein said object class is a finger vein class.

19. A non-transient computer readable medium having computer-executable instruction for implementing the method of claim 1.

* * * * *